(12) United States Patent
Woo et al.

(10) Patent No.: US 11,636,867 B2
(45) Date of Patent: Apr. 25, 2023

(54) ELECTRONIC DEVICE SUPPORTING IMPROVED SPEECH RECOGNITION

(71) Applicant: Samsung Electronics Co., Ltd., Suwon-si (KR)

(72) Inventors: Kyounggu Woo, Suwon-si (KR); Yoonju Lee, Suwon-si (KR); Hoseon Shin, Suwon-si (KR); Chulmin Lee, Suwon-si (KR); Taegu Kim, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 17/012,708

(22) Filed: Sep. 4, 2020

(65) Prior Publication Data

US 2021/0110837 A1 Apr. 15, 2021

(30) Foreign Application Priority Data

Oct. 15, 2019 (KR) .................. 10-2019-0127757

(51) Int. Cl.
*G10L 15/00* (2013.01)
*G10L 21/0208* (2013.01)
(Continued)

(52) U.S. Cl.
CPC .......... *G10L 21/0208* (2013.01); *G10L 15/08* (2013.01); *G10L 15/30* (2013.01); *G10L 2015/088* (2013.01)

(58) Field of Classification Search
CPC ..... G10L 21/0208; G10L 15/08; G10L 15/30; G10L 2015/088; G10L 21/02;
(Continued)

(56) References Cited

U.S. PATENT DOCUMENTS 9,734,827 B2    8/2017   Shin et al.
10,347,253 B2    7/2019   Foerster et al.
(Continued)

FOREIGN PATENT DOCUMENTS

CN           103561156 A     2/2014
KR    10-2018-0127100 A    11/2018
(Continued)

OTHER PUBLICATIONS

International Search Report dated Dec. 3, 2020, issued in International Patent Application No. PCT/KR2020/011924.

*Primary Examiner* — Abdelali Serrou
(74) *Attorney, Agent, or Firm* — Jefferson IP Law, LLP

(57) ABSTRACT

An electronic device is provided. The electronic device includes a microphone, a processor operatively connected to the microphone, and a memory operatively connected to the processor, wherein the memory, when executed, stores instructions for causing the processor to receive first speech data through the microphone, recognize a user input to call a voice assistant from the first speech data, convert the user input into a first wakeup score, determine the electronic device as a first reference device at least based on the first wakeup score that exceeds a designated threshold value, configure a first noise reduction space based on location information of the first reference device, determine at least one of one or more electronic devices, located in the first noise reduction space, as a first noise reduction device to perform a noise reduction operation, and control the noise reduction operation of the first noise reduction device.

17 Claims, 12 Drawing Sheets

(51) Int. Cl.
  *G10L 15/30* (2013.01)
  *G10L 15/08* (2006.01)
(58) Field of Classification Search
  CPC ......... G10L 15/22; G10L 15/28; G10L 17/12; G10L 2015/225; G06F 3/167; G10K 11/16
  See application file for complete search history.

(56) References Cited

U.S. PATENT DOCUMENTS

| | | | | |
|---|---|---|---|---|
| 11,100,923 B2* | 8/2021 | Fainberg | ............... | G10L 15/14 |
| 11,232,788 B2* | 1/2022 | Yavagal | ............... | G10L 17/08 |
| 11,258,671 B1* | 2/2022 | Vora | ............... | G10L 15/30 |
| 11,290,802 B1* | 3/2022 | Nandy | ............... | G10L 15/08 |
| 2015/0019215 A1* | 1/2015 | Shin | ............... | G10L 15/20 |
| | | | | 704/275 |
| 2015/0194152 A1* | 7/2015 | Katuri | ............... | G10L 21/0208 |
| | | | | 704/231 |
| 2016/0063997 A1 | 3/2016 | Nemala et al. | | |
| 2016/0099698 A1* | 4/2016 | Kim | ............... | H03G 3/348 |
| | | | | 381/94.5 |
| 2016/0240210 A1 | 8/2016 | Lou | | |
| 2017/0076721 A1* | 3/2017 | Bargetzi | ............... | G10L 15/22 |
| 2017/0083285 A1* | 3/2017 | Meyers | ............... | G10L 15/00 |
| 2018/0102125 A1* | 4/2018 | Ko | ............... | G10L 15/04 |
| 2019/0267004 A1* | 8/2019 | Lee | ............... | G06V 40/174 |
| 2019/0287521 A1* | 9/2019 | Su | ............... | G10L 15/30 |
| 2019/0348032 A1 | 11/2019 | Teng et al. | | |
| 2019/0385594 A1* | 12/2019 | Park | ............... | G10L 15/22 |
| 2020/0013395 A1 | 1/2020 | Jeong et al. | | |
| 2020/0125162 A1* | 4/2020 | D'Amato | ............... | G06F 3/167 |
| 2022/0093104 A1* | 3/2022 | Sharifi | ............... | G10L 15/30 |

FOREIGN PATENT DOCUMENTS

| | | |
|---|---|---|
| KR | 10-2019-0104278 A | 9/2019 |
| WO | 2018/140020 A1 | 8/2018 |

* cited by examiner

ELECTRONIC DEVICE SUPPORTING IMPROVED SPEECH RECOGNITION

CROSS-REFERENCE TO RELATED APPLICATION(S)

This application is based on and claims priority under 35 U.S.C. § 119(a) of a Korean patent application number 10-2019-0127757 filed on Oct. 15, 2019, in the Korean Intellectual Property Office, the disclosure of which is incorporated by reference herein in its entirety.

BACKGROUND

1. Field

The disclosure relates to an electronic device supporting a voice assistant service using automatic speech recognition (ASR).

2. Description of Related Art

An electronic device may support a voice assistant service. For example, the electronic device may receive user's utterance through a microphone provided on the electronic device or an external electronic device. Based on recognition of the utterance, the electronic device may perform a function of the electronic device, or may support that another electronic device performs the function.

The above information is presented as background information only to assist with an understanding of the disclosure. No determination has been made, and no assertion is made, as to whether any of the above might be applicable as prior art with regard to the disclosure.

SUMMARY

An external electronic device located around the electronic device may act as a device generating a noise in case that the electronic device performs the speech recognition. For example, a user may use a voice assistant not only in a quiet environment but also in an actual environment in which an artificial intelligence (AI) speaker mounted with a voice assistant is disposed next to a television (TV) that is in a turn-on state. In this case, various kinds of sounds may be reproduced from the TV, and the AI speaker may consider such sounds as noises. Due to such noises, it is difficult for the AI speaker to accurately recognize a speech spoken by the user.

Aspects of the disclosure are to address at least the above-mentioned problems and/or disadvantages and to provide at least the advantages described below. Accordingly, an aspect of the disclosure is to provide an electronic device that recognizes user's utterance accurately by recognizing a noise source among surrounding devices and controlling the noise source to reduce a noise when a user calls a voice assistant.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, a processor operatively connected to the microphone, and a memory operatively connected to the processor, wherein the memory, when executed, stores instructions for causing the processor to receive first speech data through the microphone, recognize a user input to call a voice assistant from the first speech data, convert the user input into a first wakeup score, determine the electronic device as a first reference device at least based on the first wakeup score that exceeds a designated threshold value, configure a first noise reduction space based on location information of the first reference device, determine at least one of one or more electronic devices, located in the first noise reduction space, as a first noise reduction device to perform a noise reduction operation, and control the noise reduction operation of the first noise reduction device.

In accordance with another aspect of the disclosure, an electronic device is provided. The electronic device includes a communication circuit, a processor operatively connected to the communication circuit, and a memory operatively connected to the processor, wherein the memory, when executed, stores instructions for causing the processor to receive information, indicating strength of a user voice received by an external electronic device, from the external electronic device through the communication circuit, determine the external electronic device as a reference device for configuring a noise reduction space, at least based on the voice strength information, configure the noise reduction space based on location information of the reference device, determine at least one of one or more electronic devices, located in the noise reduction space, as a noise reduction device to perform a noise reduction operation, and control the noise reduction operation of the noise reduction device.

According to various embodiments, the electronic device can accurately recognize a user's speech command by stopping the operation of the noise source around the user or suppressing the noise occurrence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
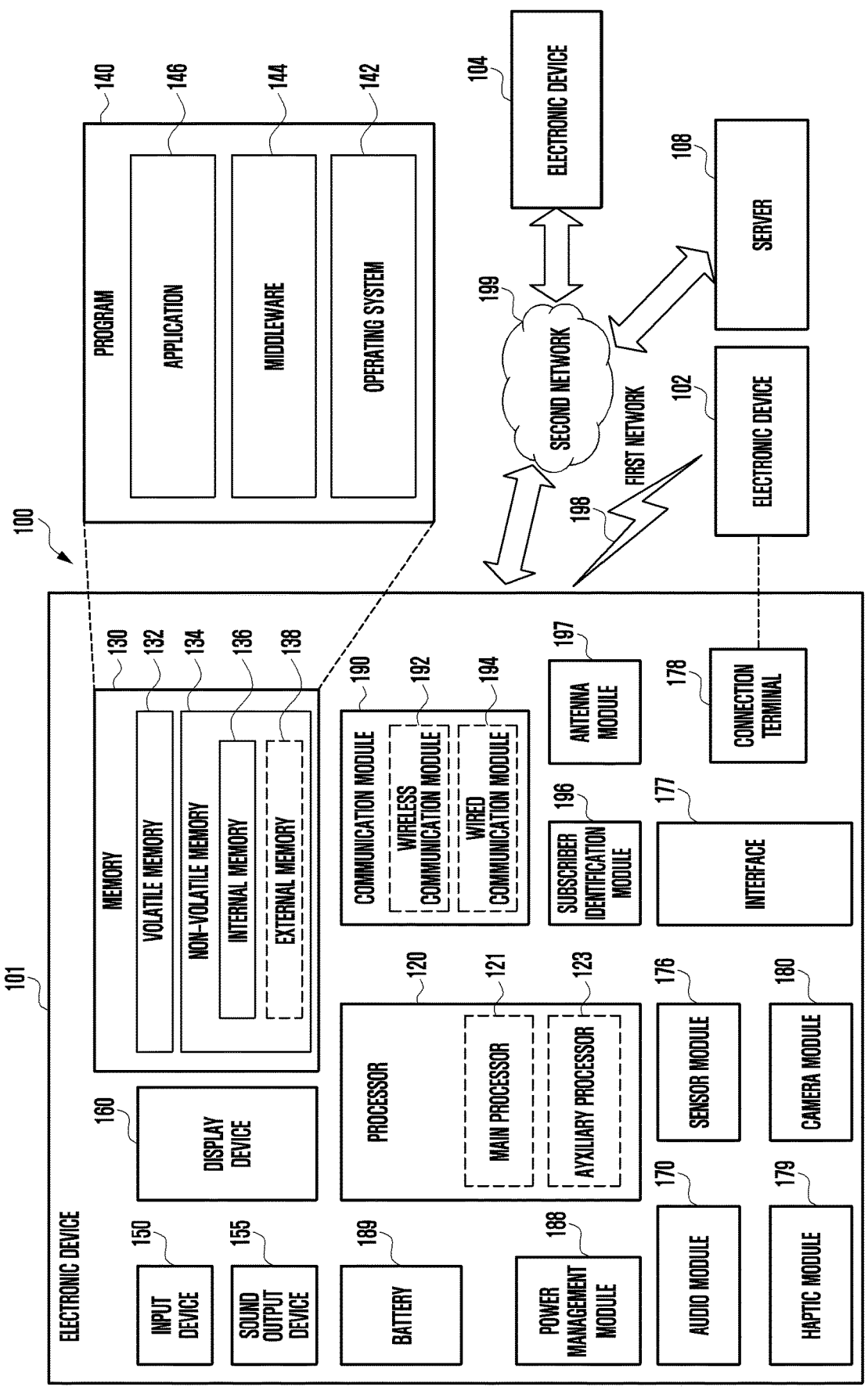
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
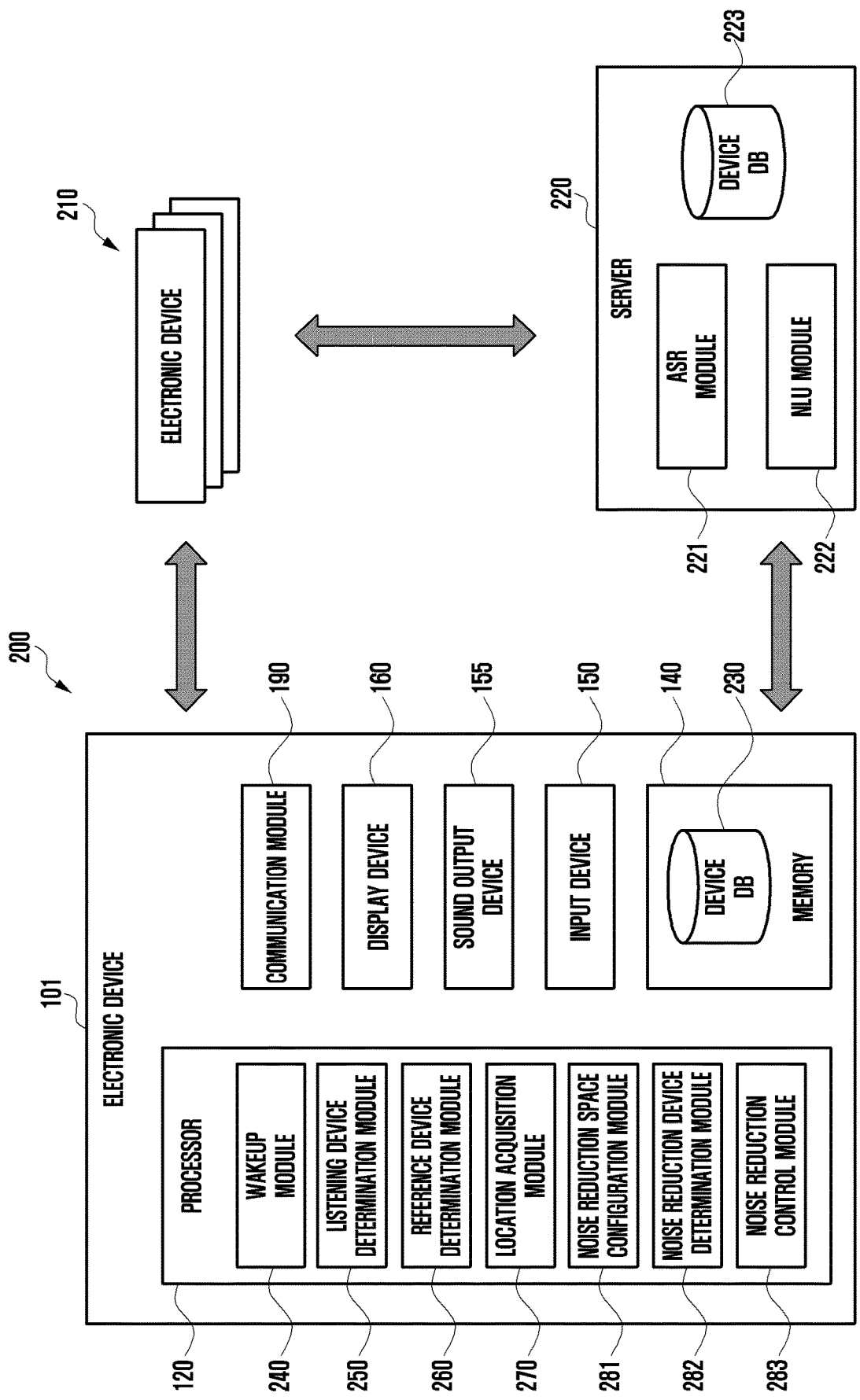
FIG. 2 is a diagram illustrating a network environment configured to make surroundings of a user be quiet for improvement of speech recognition according to an embodiment of the disclosure.

FIG. 2 is a diagram illustrating a network environment configured to make surroundings of a user be quiet for improvement of speech recognition according to an embodiment of the disclosure.

For convenience in explanation, constituent elements overlapping those of FIG. 1 will be omitted or will be simply described.

Referring to FIG. 2, in a network environment (in other words, multi devices experience (MDE) environment) 200, an electronic device 101 may communicate with external electronic devices 210 or a server 220 through a first network 198 (e.g., near field communication network) or a second network 199 (e.g., wired LAN). Even between the server 200 and the external electronic devices 210, communication may be performed through the first network 198 or the second network 199. The electronic device 101 may include a processor 120, a memory 130 including a device database (DB) 230, an input device 150, a sound output device 155, a display device 160, and a communication module 190. The processor 120 may include a wakeup module 240, a listening device determination module 250, a reference device determination module 260, a location acquisition module 270, a noise reduction space configuration module 281, a noise reduction device determination module 282, or a noise reduction control module 283. At least one of the modules 240, 250, 260, 270, 281, 282, and 283 may be configured in the electronic device 101 as separate hardware different from the processor 120. At least one of the modules 240, 250, 260, 270, 281, 282, and 283 may be software stored in the memory 130, and the processor 120 may execute the software. At least one device of the external electronic devices 210 and the server 220 may include the same constituent element as at least one of the constituent elements of the electronic device 101. The server 220 may include an automatic speech recognition (ASR) module 221, a natural language understanding (NLU) module 222, and a device DB 223. At least one device of the electronic devices 101 and 210 may include the same module as at least one of the modules 221 and 222 of the server 220.

The wakeup module 240 may wake up as it receives speech data through a microphone of the input device 150, and may recognize a user's specific utterance (e.g., "Hi Bixby") for calling a voice assistant from the received speech data.

According to an embodiment, the wakeup module 240 may acquire a portion where the user's utterance exists (e.g., a first portion corresponding to "Hi" and a second portion corresponding to "Bixby") from the speech data, by detecting a starting point and an endpoint of the user's utterance from the speech data. The wakeup module 240 may determine whether a call utterance is included in the speech data, by comparing the acquired utterance portion with pre-stored call speech data.

According to an embodiment, the wakeup module 240 may support the user in calling the voice assistant in another method that is not the speech. For example, the wakeup module 240 may recognize twice the continuous pressing of a power key of the input device 150 as a call. As another example, the wakeup module 240 may recognize a touch input, received from a touch circuit of the display device 160, as a call.

The wakeup module 240 may convert the call utterance into a wakeup score of the electronic device 101 based on the recognition of the call utterance from the speech data received through the microphone. For example, the wakeup module 240 may obtain the strength (e.g., electric power) of the call utterance portion from the speech data received through the microphone, and may determine the obtained value (hereinafter, "first value") as the wakeup score. As another example, the wakeup module 240 may obtain a ratio (signal to noise ratio (SNR)) of strength of a signal (call utterance portion) to strength of a noise included in the call utterance portion, and may determine the obtained value (hereinafter, "second value") as a wakeup score. As another example, the wakeup module 240 may determine a combination (e.g., multiplication) (hereinafter, "third value") of the first value and the second value as the wakeup score. As still another example, the wakeup module 240 may determine, as the wakeup score, a fourth value obtained by combining (e.g., multiplying) the first value, the second value, or the third value with (by) a value (weight value) indicating the performance of the microphone (e.g., the number of microphones, or sensitivity, or maximum sound pressure level (SPL) of a microphone).

The listening device determination module 250 may determine one of the electronic devices 101 and 210 as a device to listen to a user's additional utterance (speech command) after the call utterance, at least based on the wakeup score.

According to an embodiment, each of the external may be provided with a module performing the same function as the function of the wakeup module 240, and may calculate the wakeup score in the above-described manner using the module. The listening device determination module 250 may exchange the wakeup score with at least one of the external electronic devices 210 through the communication module 190. The listening device determination module 250 may determine, as a listening device, the device having acquired the highest score. For example, the listening device determination module 250 may transmit, to the external electronic devices 210, a message for notifying that the electronic device 101 is determined as the listening device based on the electronic device 101 that has acquired the highest score.

The listening device determination module 250 may determine the electronic device 101 as the listening device based on the call that is received through another input device (e.g., hardware key or touch circuit) that is not the microphone.

The reference device determination module 260 may determine at least one of the electronic devices 101 and 210 as a reference device being used to configure a noise reduction space.

According to an embodiment, the reference device determination module 260 may determine the electronic device 101 as the reference device based on the wakeup score that is obtained by the wakeup module 240 and exceeds a designated threshold value.

According to an embodiment, the reference device determination module 260 may acquire the wakeup score, which a corresponding electronic device has obtained, from at least one of the external electronic devices 210 through the communication module 190, and may determine the corresponding electronic device as the reference device based on the acquired score that exceeds the threshold value. The reference device determination module 260 may transmit a message for notifying that the corresponding electronic device is determined as the reference device, to the corresponding electronic device through the communication module 190.

According to an embodiment, the reference device determination module 260 may determine one of the wakeup devices having woken up by the user's utterance as the reference device, based on priority information designated for each of the electronic devices 101 and 210. For example, the reference device determination module 260 may receive a message including status information related to the wakeup (e.g., wakeup score) from at least one of the external electronic devices 210 through the communication module 190. The reference device determination module 260 may determine, as the reference device, the device configured to have the highest priority among the wakeup devices having the wakeup scores exceeding the threshold value. For example, if the electronic device 101 is configured to have the highest priority among the wakeup devices, the reference device determination module 260 may determine only the electronic device 101 as the reference device. If one of the external electronic devices is configured to have the highest priority, the reference device determination module 260 may transmit a message for notifying that the corresponding electronic device is determined as the reference device, to the corresponding electronic device through the communication module 190.

According to an embodiment, the reference device determination module 260 may determine the electronic device 101 as the reference device based on the voice assistant that is called through another input device (e.g., hardware key or touch circuit) that is not the microphone.

The location acquisition module 270 may acquire location information of the reference device. The location information may include information indicating a space in which the reference device is located (e.g., living room, kitchen, room 1, room 2, or room 3), information related to a geographic location of the reference device (e.g., global positioning system (GPS) information, an Internet address (Internet protocol (IP)), identification information (e.g., basic service set identifier (BSSID)) of an access point connected to the reference device through a wireless or wired communication channel, or location information of a base station connected to the reference device through a cellular communication module of a wireless communication module 192), and/or information related to a relative location of the reference device (e.g., distance between the reference device and another device).

According to an embodiment, the location acquisition module 270 may transmit a message for requesting the location information of the reference device, to the server 220 through the communication module 190, and may receive the location information from the server 220 through the communication module 190 as a response to the request message.

According to an embodiment, the location acquisition module 270 may acquire the location information from the device DB 230 stored in the memory 130. The location acquisition module 270 may synchronize the device DB 230 with the device DB 223 of the server 220 through a periodic communication with the server 220.

According to an embodiment, the location acquisition module 270 may acquire the location information of the reference device at least based on the strength of the user's utterance. For example, the location acquisition module 270 may transmit a message for requesting the strength of the user's utterance (e.g., call utterance), to the external electronic devices 210 through the communication module 190. The location acquisition module 270 may receive a value, indicating the strength of the user's utterance obtained by the corresponding electronic device, from at least one of the external electronic devices 210 through the communication module 190 as a response to the request message. The location acquisition module 270 may obtain the distance between the electronic devices through comparison of the strength obtained by the electronic device 101 with the received strength(s), and may use the obtained distance as a relative location of the reference device.

According to an embodiment, the location acquisition module 270 may obtain the distance between the electronic device 101 and the external electronic devices 210 using a positioning means, for example, Bluetooth and/or Wi-Fi modules of the communication module 190, based on the electronic device 101 that has been determined as the reference device, and may use the obtained distance as the relative location of the electronic device 101.

The noise reduction space configuration module 281 may configure a noise reduction space based on the location of the reference device identified through the location acquisition module 270. For example, the noise reduction space configuration module 281 may identify a space, in which the reference device is located, through the location acquisition module 270, and may configure the identified space (e.g., living room) as the noise reduction space. As another example, the noise reduction space configuration module 281 may configure a space within a radius, given around the location of the reference device, as the noise reduction space.

The noise reduction device determination module 282 may determine at least one of device(s), located in the noise reduction space, as a device to perform a noise reduction operation (in other words, to enter a noise reduction mode).

According to an embodiment, the noise reduction device determination module 282 may identify the device(s), located in the noise reduction space, by identifying location information of each of the electronic devices 101 and 210 (e.g., information indicating a space in which the corresponding device is located or information related to a geometric or relative location in which the corresponding device is located). For example, the noise reduction device determination module 282 may get location information of the respective devices from the device DB 230 or the device DB 223 of the server 220. As another example, the noise reduction device determination module 282 may get the location information of the respective devices through positioning communication with the external electronic devices 210. The noise reduction device determination module 282 may determine the identified device(s) as the noise reduction device(s).

According to an embodiment, the noise reduction device determination module 282 may identify a noise source (e.g., speaker, vacuum cleaner, TV, air conditioner, or washing machine) by identifying kinds of device(s) located in the noise reduction space, device specifications and/or capability information. For example, the noise reduction device determination module 282 may get the kinds, specifications, and/or capability information of the respective devices from the device DB 230 or the device DB 223 of the server 220. As another example, the noise reduction device determination module 282 may get the kinds, specifications, and/or capability information of the respective devices through communication with the external electronic devices 210. The noise reduction device determination module 282 may determine the identified noise source(s) as the noise reduction device(s).

According to an embodiment, the noise reduction device determination module 282 may determine at least one of noise source(s) as the noise reduction device based on information indicating the operation status of the noise source(s). For example, the noise reduction device determination module 282 may determine the electronic device 101 as the noise source based on the electronic device 101 that is identified as the noise source and the operation status thereof is identified as a noise causing status. The noise reduction device determination module 282 may transmit a message for requesting the operation status information to the external electronic device(s) determined as the noise source through the communication module 190, and may receive the operation status information from the external electronic device(s) through the communication module 190 in response to the request message. The noise reduction device determination module 282 may determine the external electronic device(s) identified as being currently causing the noise as the noise reduction device. For example, if it is identified that the operation status of the TV is a power-off status although the TV is a noise source, the TV may be excluded from the noise reduction device. If it is identified that the operation status of the TV is a power-on status, the TV may be determined as the noise reduction device.

The noise reduction control module 283 may perform a noise reduction operation (e.g., operation to reduce the noise or operation to end the noise causing function) based on the electronic device 101 that is determined as the noise reduction device. The noise reduction control module 283 may transmit a control signal for performing the noise reduction operation to the corresponding electronic device directly in order to reduce latency or through the server 220. The corresponding electronic device may perform the noise reduction operation based on the reception of the control signal. For example, the air conditioner may lower the air volume step by step, or may reconfigure the air volume equal to or lower than a given output value (e.g., 10%). Further, the TV or the speaker may operate in a silence mode. The vacuum cleaner (e.g., robotic or wireless vacuum cleaner) may lower an output of a motor step by step, or may reconfigure the output of the motor equal to or lower than a given value. Further, the vacuum cleaner may stop for a given time or until the noise reduction mode is released.

The noise reduction control module 283 may end the noise reduction operation based on the network environment 200 that satisfies the noise reduction release condition.

According to an embodiment, the noise reduction control module 283 may drive a timer based on the noise reduction operation that has started. The noise reduction control module 283 may determine the expiration of the timer setting time as the noise reduction release condition, and may end the noise reduction operation based on this. For example, if the electronic device 101 is configured as the noise reduction device, the noise reduction control module 280 may end the noise reduction operation of the electronic device 101 by releasing the configuration. At least one of the external electronic devices 210 may be configured as the noise reduction device, and thus the noise reduction control module 280 may control the corresponding electronic device to end the noise reduction operation by transmitting a control signal for ending the noise reduction operation to the corresponding electronic device through the communication module 190.

According to an embodiment, the listening device may listen to a user's addition utterance after the call utterance. The noise reduction control module 283 may determine completion of listening to the additional utterance as the noise reduction release condition, and may end the noise reduction operation based on this. For example, the electronic device 101 may be the listening device, and thus the noise reduction control module 280 may identify the detection of the additional utterance endpoint from the wakeup module 240, and may end the noise reduction operation based on this.

According to an embodiment, the noise reduction control module 283 may determine that the operation in accordance with the user's additional utterance is completely performed as the noise reduction release condition, and may end the noise reduction operation based on this. For example, the listening device may generate and transmit speech data corresponding to the user's utterance to the server 220. The ASR module 221 of the server 220 may generate text data corresponding to the user's utterance through recognition of the user's utterance from the speech data. The NLU module 222 of the server 220 may grasp the user's intent by performing syntactic analysis or semantic analysis of the text data. The server 220 may perform the operation based on the user's intent, or may control another device (e.g., at least one of the electronic devices 101 and 210) to perform the corresponding operation. For example, as a message for notifying of the result in accordance with the performing of the operation or the completion of the performing of the operation, the utterance of the voice assistant may be output through the sound output device 155 of the electronic device 101, and based on the completion of the output of the utterance, the noise reduction control module 283 may end the noise reduction operation. In a certain embodiment, the electronic device 101 may include a module performing the same function as the function of the modules 221 and 222 of the server 220. Accordingly, the electronic device 101 may control the end of the noise reduction operation based on the completion of the performing of the operation in accordance with the user's additional utterance.

Figure 3:
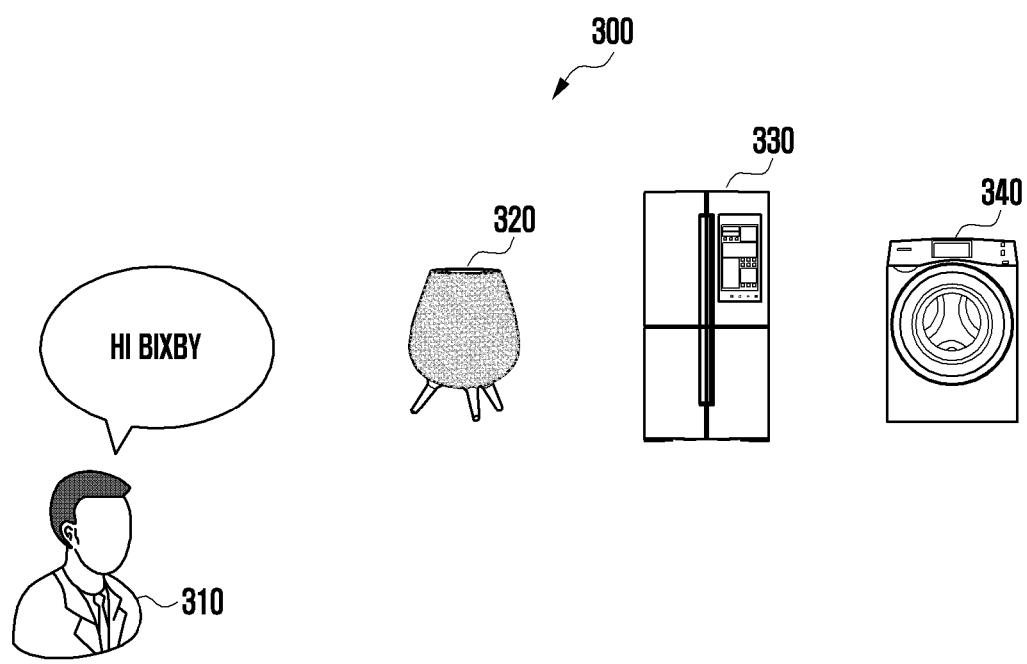
FIG. 3 is a diagram explaining an operation of determining a reference device in a network environment according to an embodiment of the disclosure.

FIG. 3 is a diagram explaining an operation of determining a reference device in a network environment according to an embodiment of the disclosure.

Referring to FIG. 3, in a network environment 300 (e.g., network environment 200 of FIG. 2), electronic devices 320, 330, and 340 (e.g., electronic devices 101 and 210 of FIG. 2) may be located in the neighborhood of a user 310. For example, the electronic devices 320, 330, and 340 may be a speaker, a refrigerator, and a washing machine, respectively, and each of them may include a microphone and a wakeup module (wakeup module 240 of FIG. 2). At least one of the electronic devices 320, 330, and 340 may further include a reference device determination module (e.g., reference device determination module 260 of FIG. 2).

The user 310 may utter, for example, "Hi Bixby" to call the voice assistant, and the electronic devices 320, 330, and 340 may listen to the utterance. Each of the electronic devices 320, 330, and 340 may recognize the "Hi Bixby" as the call utterance, and thus may convert the "Hi Bixby" into a wakeup score. Each of the electronic devices 320, 330, and 340 may share the obtained wakeup score with other devices through a server (not illustrated) (e.g., server 220 of FIG. 2) or through a direct communication.

In an embodiment, the speaker 320 may determine at least one of the electronic devices 320, 330, and 340 as a reference device through comparison of wakeup scores with a designated threshold value. For example, the wakeup scores obtained by the speaker 320, the refrigerator 330, and the washing machine 340 may be 100, 50, and 10, respectively, and the threshold value may be set to 30. Accordingly, the speaker 320 may determine the speaker 320 and the refrigerator 330 as the reference devices based on the score obtained by the speaker 320 and the score obtained by the refrigerator 330, which exceed the threshold value. The speaker 320 may transmit a message for notifying that the refrigerator 330 is determined as the reference device to the refrigerator 330.

In an embodiment, the speaker 320 may determine the device having the highest priority among the wakeup devices having wakeup scores exceeding the threshold value as the reference device. For example, in the above-described example, the wakeup score of the speaker 320 may be higher than the wakeup score of the refrigerator 330, but the priority of the refrigerator 330 may be higher than the priority of the speaker 320. Accordingly, the speaker 320 may determine only the refrigerator 330 as the reference device.

In an embodiment, each of the electronic devices 320, 330, and 340 may include the reference device determination module, and thus may determine whether itself is determined as the reference device through comparison of the wakeup score obtained by itself with the threshold value.

In an embodiment, one of the electronic devices 320, 330, and 340, for example, only the speaker 320, may be provided with the microphone and the wakeup module. Accordingly, the speaker 320 may determine the itself as the reference device based on the "Hi Bixby" that is recognized as the call utterance.

In an embodiment, the reference device may be determined by another input (e.g., key input or touch input) that is not the utterance. For example, the user may press a button provided on the speaker 320, and thus the speaker 320 may determine the itself as the reference device.

Figure 4:
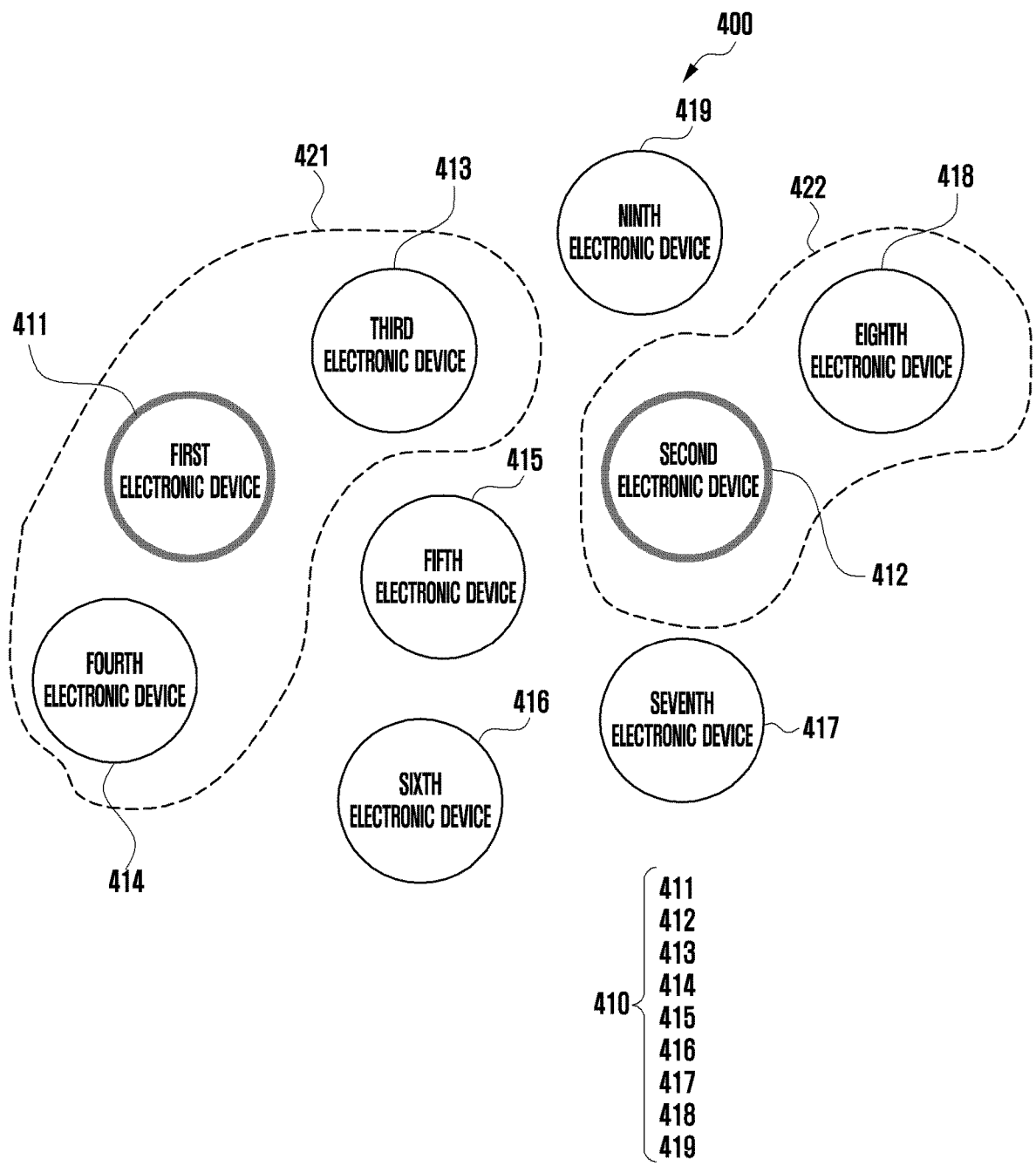
FIG. 4 is a diagram explaining an operation of configuring a noise reduction space and determining a noise reduction device in a network environment according to an embodiment of the disclosure.

FIG. 4 is a diagram explaining an operation of configuring a noise reduction space and determining a noise reduction device in a network environment according to an embodiment of the disclosure.

Referring to FIG. 4, an electronic devices 410 (e.g., electronic devices 101 and 210 of FIG. 2) may be disposed in a network environment 400 (e.g., network environment 200 of FIG. 2). For convenience in explanation, explanation will be made under the assumption that a first electronic device 411 (e.g., speaker 320 of FIG. 3) and a second electronic device 412, (e.g., refrigerator 330 of FIG. 3) are determined as reference devices.

The first electronic device 411 may operate as a device configured to determine a noise reduction space and a noise reduction device (e.g., including the noise reduction space configuration module 281 and the noise reduction device determination module 282 of FIG. 2). For example, the first electronic device 411 may configure a first noise reduction space 421 based on the location of the first electronic device 411 identified through a location acquisition module (e.g., location acquisition module 270 of FIG. 2). In the network environment 400, the first electronic device 411 may identify the electronic devices 411, 413, and 414 located in the first noise reduction space 421, and may select them as first noise reduction candidates. The first electronic device 411 may determine at least one of first noise reduction candidates 411, 413, and 414 as a noise reduction device. For example, the first electronic device 411 may acquire device information on the first noise reduction candidates 411, 413, and 414 from a device DB (e.g., device DB 230 of FIG. 2) of the first electronic device 411 or a server (not illustrated) (e.g., server 220 of FIG. 2). For example, the device information may include information indicating the kind of the corresponding device, information indicating the geographic or relative location of the corresponding device, information indicating the operation status of the corresponding device, and information indicating device specifications (or capability). The first electronic device 411 may determine at least one of the first noise reduction candidates 411, 413, and 414 as the first noise reduction device based on the acquired device information.

The first electronic device 411 may configure a second noise reduction space 422 based on the location of the second electronic device 412 identified through the location acquisition module. The first electronic device 411 may select the electronic devices 412 and 418 located in the second noise reduction space 422 in the network environment 400 as second noise reduction candidates. The first electronic device 411 may acquire device information of the second noise reduction candidates 412 and 418 from the DB, and may determine at least one of the second noise reduction candidates 412 and 418 as a second noise reduction device based on the acquired information.

In an embodiment, the second electronic device 412 may include a noise reduction space configuration module, and may configure the second noise reduction space 422 instead of the first electronic device 411.

In an embodiment, the second electronic device 412 may include a noise reduction device determination module, and may determine the second noise reduction device instead of the first electronic device 411.

In an embodiment, at least one of the electronic devices 410 may be classified into a freely movable device of which the location is not fixed. For example, the first electronic device 411 and the second electronic device 412 may receive identification information (e.g., information indicating the kind of the device) for identifying whether the device is movable from the ninth electronic device 419 through the communication circuit, and may classify the ninth electronic device 419 as the movable device based on the received identification information (e.g., vacuum cleaner). The first electronic device 411 may calculate a first distance between the first electronic device 411 and the ninth electronic device 419 using positioning communication with the ninth electronic device 419. The first electronic device 411 may determine whether the ninth electronic device 419 is located in the first noise reduction space 421 based on the first distance. If it is determined that the ninth electronic device 419 is located in the first noise reduction space 421, the first electronic device 411 may add the ninth electronic device 419 to the first noise reduction candidates. The second electronic device 412 may calculate a second distance between the second electronic device 412 and the ninth electronic device 419 using the positioning communication with the ninth electronic device 419. The second electronic device 412 may determine whether the ninth electronic device 419 is located in the second noise reduction space 422 based on the second distance. If it is determined that the ninth electronic device 419 is located in the second noise reduction space 422, the second electronic device 412 may add the ninth electronic device 419 to the second noise reduction candidates.

In an embodiment, the electronic device determined as the listening device in the network environment 400 may determine the ninth electronic device 419 as the noise reduction device based on the distance between the listening device and the ninth electronic device 419 regardless of the noise reduction space. For example, if the first distance is within the designated threshold value, the first electronic device 411 may determine the ninth electronic device 419 as the noise reduction device based on the first electronic device 411 that is determined as the listening device.

In an embodiment, regardless of the noise reduction space, the first electronic device 411 may search for a designated noise source in the network environment 400, and may determine the searched noise source as the noise reduction device. For example, the first electronic device 411 may search for a specific noise source among the electronic devices 410 in response to a case that the call utterance is recognized from the speech data received through the microphone. For example, the first electronic device 411 may classify the ninth electronic device 419 into a device generating a strong noise based on the identification information of the corresponding device (e.g., robotic vacuum cleaner), and thus may determine the ninth electronic device 419 as the noise reduction device. As another example, the first electronic device may recognize that the operation status of the ninth electronic device 419, which is classified into the strong noise source, is a noise causing status, and thus may determine the ninth electronic device 419 as the noise reduction device.

Figure 5:
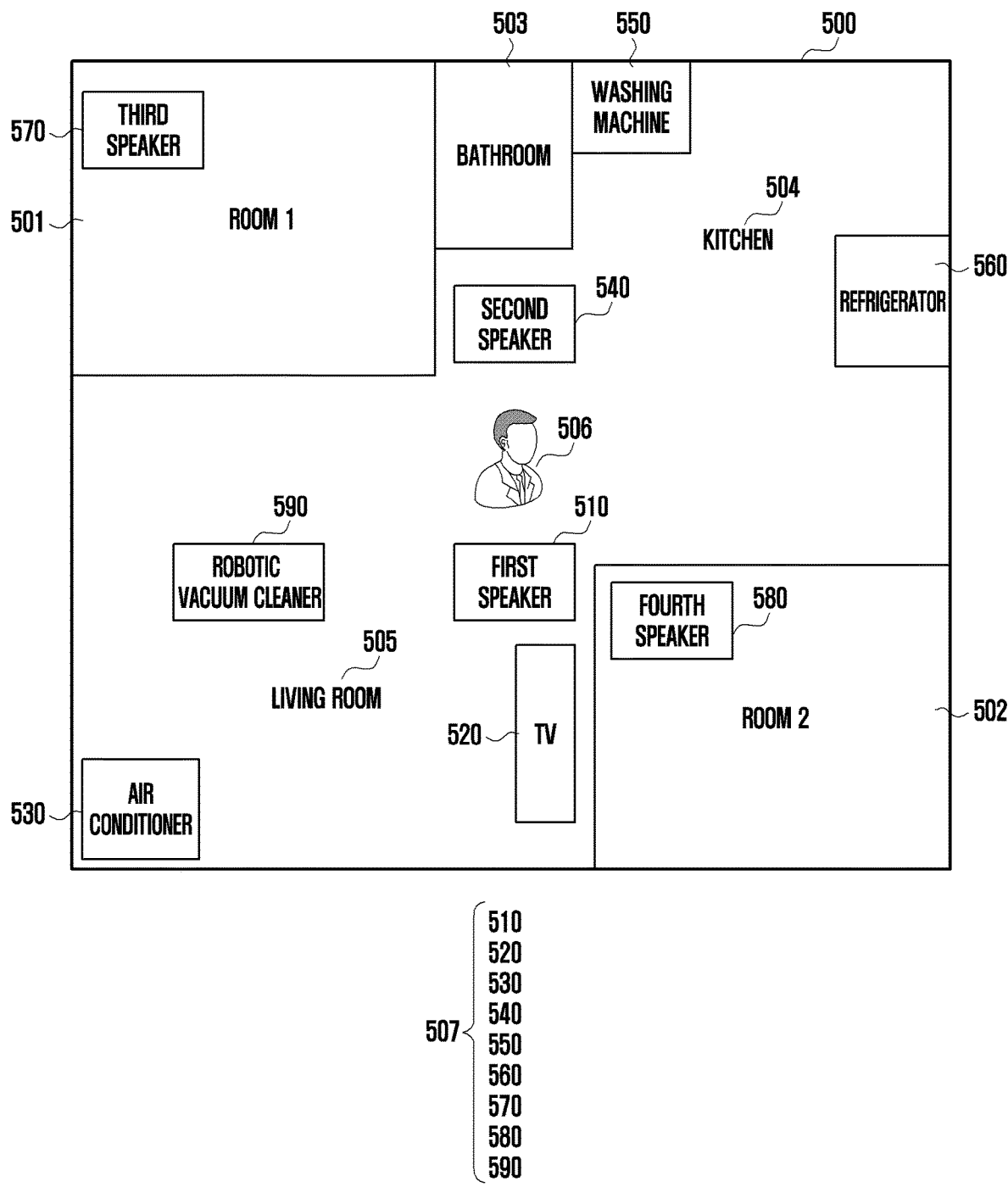
FIG. 5 is a diagram explaining an operation of configuring a noise reduction space and determining a noise reduction device in a home network environment according to an embodiment of the disclosure.

FIG. 5 is a diagram explaining an operation of configuring a noise reduction space and determining a noise reduction device in a home network environment according to an embodiment of the disclosure.

Referring to FIG. 5, a home network environment 500 (e.g., network environment 200 of FIG. 2) may be partitioned into room 1 501, room 2 502, a bathroom 503, a kitchen 504, and a living room 505. In the living room 505, a first speaker 510, a TV 520, and an air conditioner 530 may be disposed. In the kitchen 504, a second speaker 540, a washing machine 550, and a refrigerator 560 may be disposed. In room 1 501, a third speaker 570 may be disposed. In room 2 502, a fourth speaker 580 may be disposed. Although it is illustrated that a robotic vacuum cleaner 590 is located in the living room 505, the location of the robotic vacuum cleaner 590 may be flexible. For convenience in explanation, explanation will be made under the assumption that the speakers 510 and 540 located around a user 506 are determined as reference devices in accordance with a call utterance of the user 506, and the first speaker 510 is a device configured to configure the noise reduction space, to determine the noise reduction device (e.g., including the noise reduction space configuration module 281 and the noise reduction device determination module 282 of FIG. 2), and to identify information of devices 507 (e.g., kind information, location information, operation status information, and device specification information).

The first speaker 510 may recognize that the first speaker 510 is located in the living room 505 as a first reference device, and the second speaker 540 is located in the kitchen 504 as a second reference device, and based on such recognition, the first speaker 510 may configure the living room 505 and the kitchen 504 as the noise reduction space. Among electronic devices 507, the first speaker 510 may identify electronic devices 510, 520, 530, 540, 550, 560, and 590 located in the nose reduction space, and may select them as noise reduction candidates. The first speaker 510 may determine at least one of the noise reduction candidates as the noise reduction device at least based on the corresponding device information.

Figure 6:
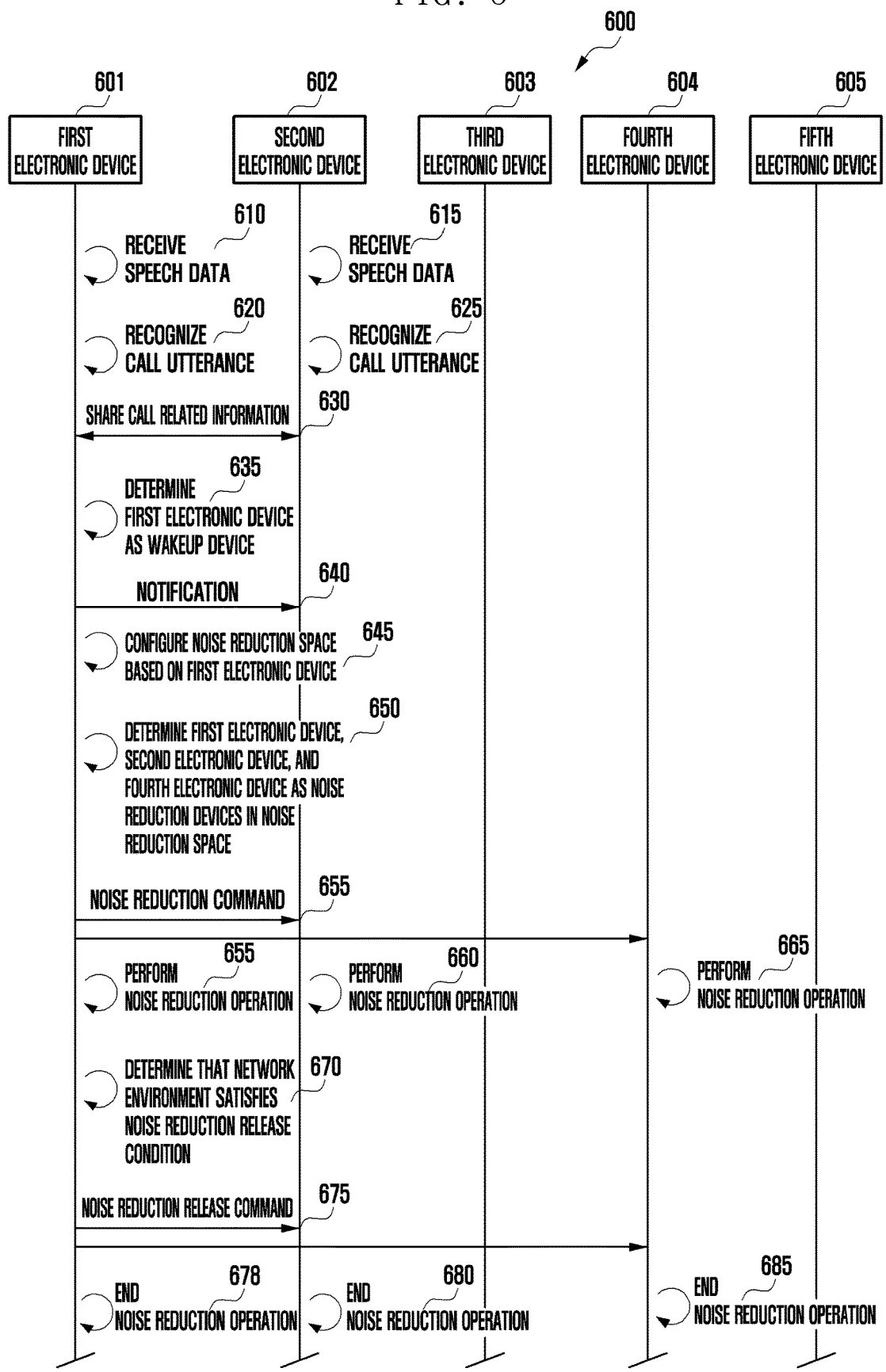
FIG. 6 is a flowchart explaining operations for improvement of speech recognition in a network environment according to an embodiment of the disclosure.

FIG. 6 is a flowchart explaining operations for improvement of speech recognition in a network environment according to an embodiment of the disclosure.

Referring to FIG. 6, electronic devices 601, 602, 603, 604, and 605 (e.g., electronic devices 101 and 210 of FIG. 2) may be disposed in a network environment 600 (e.g., network environment 200 of FIG. 2). For convenience in explanation, constituent elements overlapping those of FIG. 2 will be omitted or will be simply described.

At operation 610, the first electronic device 601 (e.g., electronic device 101 of FIG. 2) may receive speech data through the microphone. At operation 615, the second electronic device 602 may also receive the speech data through the microphone.

At operation 620, the first electronic device 601 may recognize a call utterance from the received speech data. At operation 625, the second electronic device 602 may also recognize the call utterance from the received speech data.

At operation 630, the first electronic device 601 may share call related information with the second electronic device 602. For example, the first electronic device 601 may convert the call utterance into a first wakeup score, and may broadcast the first wakeup score. The second electronic device 602 may also convert the call utterance into a second wakeup score, and may broadcast the second wakeup score.

At operation 635, the first electronic device 601 may determine the first electronic device 601 as a wakeup device based on the shared call related information. For example, if the first wakeup score is higher than the second wakeup score, the first electronic device 601 may be determined as the wakeup device.

At operation 640, the first electronic device 601 may transmit a notification message for notifying that the first electronic device 601 is determined as the wakeup device to the second electronic device 602.

At operation 645, the first electronic device 601 may determine the first electronic device 601 as the reference device, and based on this, it may configure a noise reduction space. For example, based on the first wakeup score that exceeds the threshold value, the first electronic device 601 may determine the first electronic device 601 as the reference device. The first electronic device 601 may configure the noise reduction space based on the location of the first electronic device 601 identified through the location acquisition module (e.g., location acquisition module 270 of FIG. 2).

At operation 650, the first electronic device 601 may identify the electronic devices located in the noise reduction space, and may determine the first electronic device 601, the second electronic device 602, and the fourth electronic device 604 among the identified electronic devices as the noise reduction devices based on the device information (e.g., kind information, operation status information, or device specification information).

At operation 655, the first electronic device 601 may transmit a noise reduction command to the second electronic device 602 and the fourth electronic device 604, and may perform the noise reduction operation. At operation 660, the second electronic device 602 may perform the noise reduction operation based on the reception of the noise reduction command. At operation 665, the fourth electronic device 604 may perform the noise reduction operation based on the reception of the noise reduction command.

At operation 670, the first electronic device 601 may determine that the network environment 600 satisfies a noise reduction release condition. For example, the first electronic device 601 may drive a timer with a start of the noise reduction operation by the first electronic device 601, and may determine the expiration of the timer setting time as the noise reduction release condition. As another example, the first electronic device 601 may listen to a user's additional utterance, and may determine the completion of the listening of the additional utterance as the noise reduction release condition. As still another example, the first electronic device 601 may determine completion of the operation by the first electronic device 101 in accordance with the user's additional utterance or reception of a notification of operation completion from another device as the noise reduction release condition.

At operation 675, the first electronic device 601 may transmit a noise reduction release command to the second electronic device 602 and the fourth electronic device 604, and may end the noise reduction operation at operation 678. At operation 680, the second electronic device 602 may end the noise reduction operation based on the reception of the noise reduction release command. At operation 685, the fourth electronic device 604 may end the noise reduction operation based on the reception of the noise reduction release command.

Figure 7:
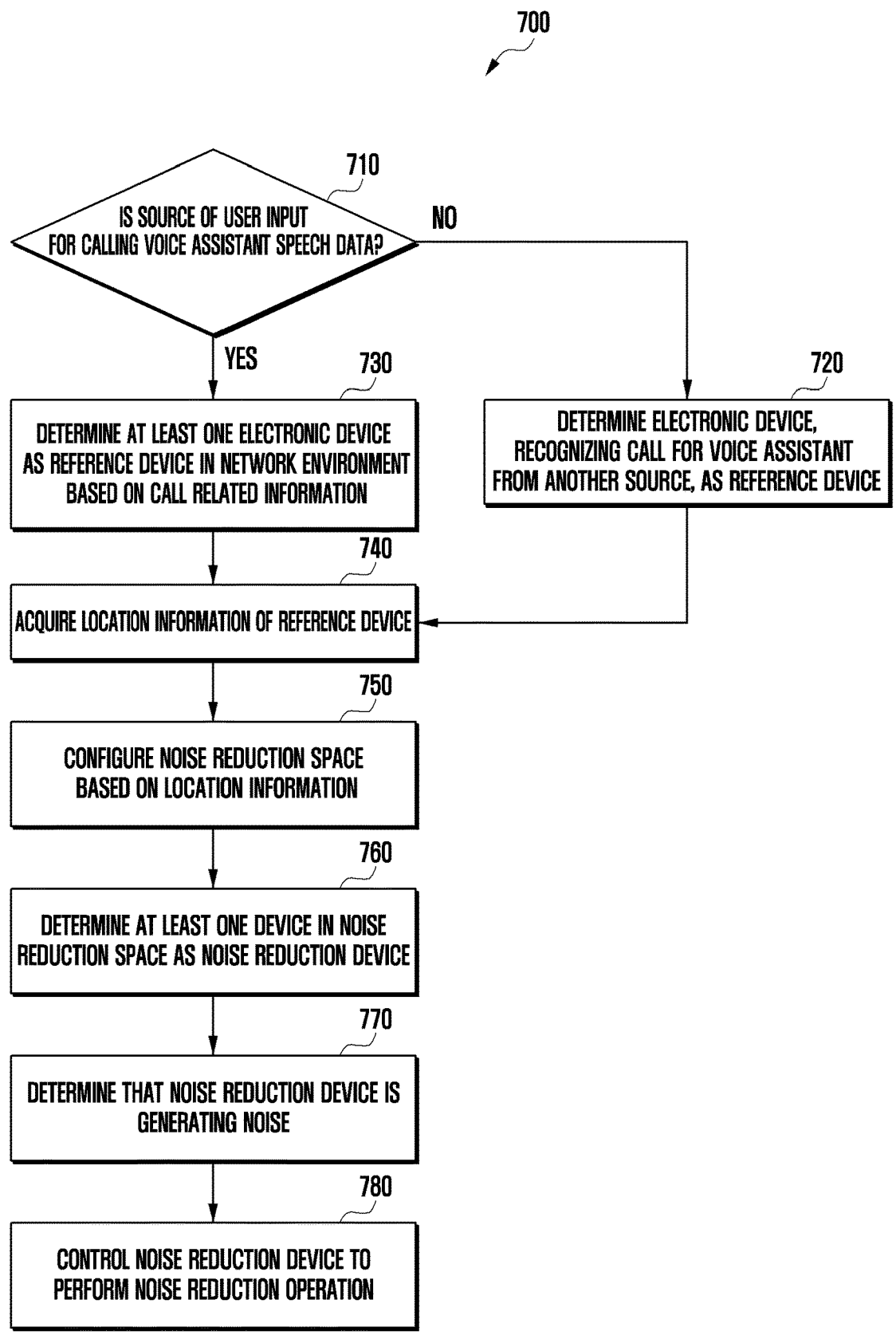
FIG. 7 is a diagram illustrating operations for improvement of speech recognition of an electronic device according to an embodiment of the disclosure.

FIG. 7 is a diagram illustrating operations for improvement of speech recognition of an electronic device according to an embodiment of the disclosure.

Referring to FIG. 7, a method 700 may be performed by the processor 120 of the electronic device 101 located in the network environment 200 of FIG. 2. For convenience in explanation, constituent elements overlapping those of FIG. 2 will be omitted or will be simply described.

At operation 710, the processor 120 may determine whether a source of a user input for calling a voice assistant is speech data.

At operation 720, if it is determined that the source is not the speech data, but another source (e.g., key input or touch input) (No at operation 710), the processor 120 may determine the electronic device 101 having recognized the call of the voice assistant from another source as the reference device.

At operation 730, if it is determined that the source is the speech data (Yes at operation 710), the processor 120 may determine at least one electronic device in the network environment 200 as the reference device based on the call related information (e.g., wakeup scores obtained by the respective electronic devices having listened to the call utterance in the network environment 200).

At operation 740, the processor 120 may acquire location information of the reference device from the device DB (e.g., device DB 230 of FIG. 2 or the device DB 223 of the server 220).

At operation 750, the processor 120 may configure the noise reduction space based on the location information. For example, the processor 120 may configure a space in which the reference device is located or a space within a radius given around the reference device as the noise reduction space.

At operation 760, the processor 120 may identify the electronic device(s) located in the noise reduction space in the network environment 200, and may determine at least one of the identified electronic device(s) as the noise reduction device.

At operation 770, the processor 120 may determine that the noise reduction device is generating a noise based on the operation status information of the noise reduction device.

At operation 780, the processor 120 may control the noise reduction device to perform the noise reduction operation (e.g., operation to reduce the noise or operation to end the noise causing function).

Figure 8:
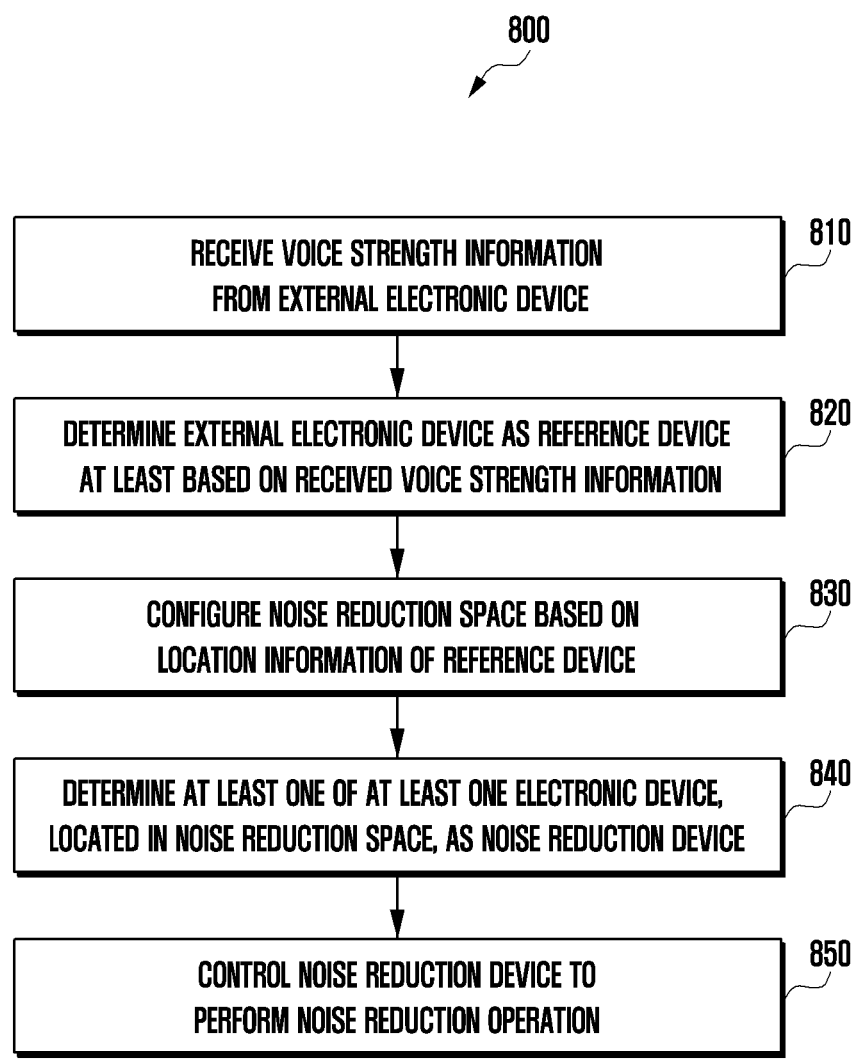
FIG. 8 is a diagram illustrating operations for improvement of speech recognition of an electronic device according to an embodiment of the disclosure.

FIG. 8 is a diagram illustrating operations for improvement of speech recognition of an electronic device according to an embodiment of the disclosure.

Referring to FIG. 8, a method 800 may be performed by the processor 120 of the electronic device 101 located in the network environment 200 of FIG. 2. For convenience in explanation, constituent elements overlapping those of FIG. 2 will be omitted or will be simply described.

At operation 810, the processor 120 may receive, from an external electronic device (e.g., at least one of external electronic devices 210 of FIG. 2), information (e.g., wakeup score) indicating strength of a user voice listened by the external electronic device.

At operation 820, the processor 120 may determine the external electronic device as the reference device at least based on the received voice strength information (e.g., in case that the wakeup score exceeds the designated threshold value).

At operation 830, the processor 120 may configure the noise reduction space based on the location information of the reference device. For example, the processor 120 may configure a space in which the reference device is located or a space within a radius given around the reference device as the noise reduction space.

At operation 840, the processor 120 may identify the electronic device(s) located in the noise reduction space in the network environment 200, and may determine at least one of the identified electronic device(s) as the noise reduction device.

At operation 850, the processor 120 may control the noise reduction device to perform the noise reduction operation (e.g., operation to reduce the noise or operation to end the noise causing function).

Figure 9:
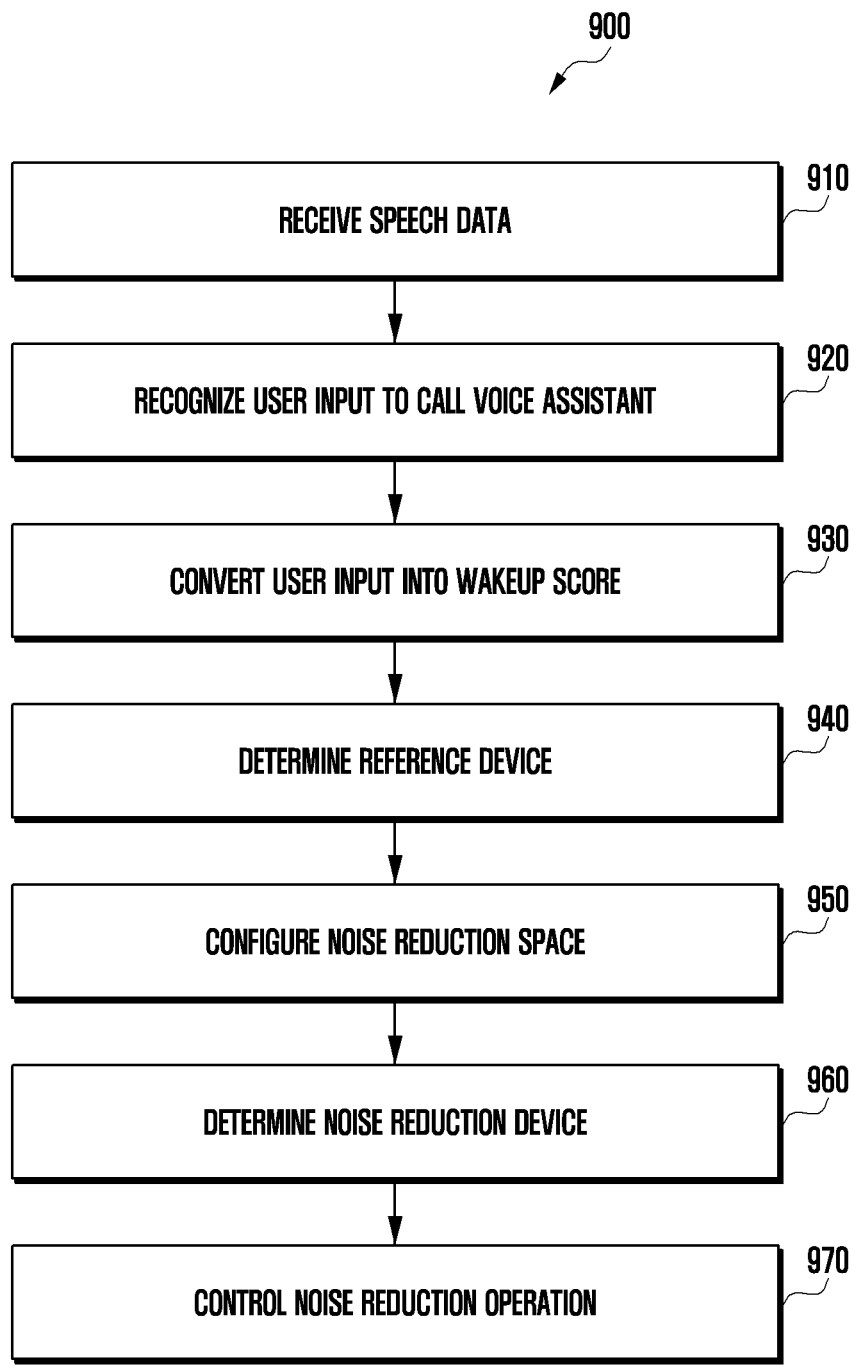
FIG. 9 is a diagram illustrating operations for improvement of speech recognition of an electronic device according to an embodiment of the disclosure.

FIG. 9 is a diagram illustrating operations for improvement of speech recognition of an electronic device according to an embodiment of the disclosure.

Referring to FIG. 9, a method 900 may be performed by the processor 120 of the electronic device 101 located in the network environment 200 of FIG. 2. For convenience in explanation, constituent elements overlapping those of FIG. 2 will be omitted or will be simply described.

At operation 910, the processor 120 may receive the speech data through the microphone of the electronic device 101.

At operation 920, the processor 120 may recognize the user input (e.g., "Hi Bixby") for calling the voice assistant from the speech data.

At operation 930, the processor 120 may convert the recognized user input into the wakeup score. For example, the processor 120 may calculate the wakeup score (e.g., the first value, the second value, the third value, or the fourth value) from the user input using the wakeup module 240.

At operation 940, the processor 120 may determine the electronic device 101 as the reference device at least based on the wakeup score that exceeds the designated threshold value.

At operation 950, the processor 120 may configure the noise reduction space based on the location information of the electronic device 101 determined as the reference device.

At operation 960, the processor 120 may determine at least one of the at least one electronic device located in the noise reduction space as the noise reduction device to perform the noise reduction operation.

At operation 970, the processor 120 may control the noise reduction operation of the noise reduction device. In an embodiment, the processor 120 may perform the noise reduction operation of the electronic device 101 based on the including of the electronic device 101 in the noise reduction device. Based on the including of the external electronic device in the noise reduction device, the processor 120 may transmit a control signal for performing the noise reduction operation to the external electronic device through the communication circuit of the electronic device 101.

According to various embodiments, an electronic device may include a microphone; a processor operatively connected to the microphone; and a memory operatively connected to the processor, wherein the memory, when executed, stores instructions for causing the processor to: receive first speech data through the microphone, recognize a user input to call a voice assistant from the first speech data, convert the user input into a first wakeup score, determine the electronic device as a first reference device at least based on the first wakeup score that exceeds a designated threshold value, configure a first noise reduction space based on location information of the first reference device, determine at least one of one or more electronic devices, located in the first noise reduction space, as a first noise reduction device to perform a noise reduction operation, and control the noise reduction operation of the first noise reduction device.

The electronic device may further include a communication circuit operatively connected to the processor, wherein the instructions may cause the processor to: perform the noise reduction operation of the electronic device based on the electronic device that is included in the first noise reduction device, and transmit a control signal for performing the noise reduction operation, to an external electronic device through the communication circuit, based on the external electronic device that is included in the first noise reduction device.

The instructions may cause the processor to: receive a second wakeup score from an external electronic device through the communication circuit, determine the external electronic device as a second reference device at least based on the second wakeup score that exceeds the threshold value, configure a second noise reduction space based on location information of the second reference device, determine at least one of one or more external electronic devices, located in the second noise reduction space, as a second noise reduction device to perform a noise reduction operation, and control the noise reduction operation of the second noise reduction device.

The instruction may cause the processor to: receive a second wakeup score from an external electronic device through the communication circuit, determine the external electronic device as a second reference device at least based on the second wakeup score that exceeds the threshold value, and transmit information indicating that the external electronic device is determined as the second reference device, to the external electronic device through the communication circuit.

The instructions may cause the processor to: acquire the location information of the first reference device from a server through the communication circuit, store the location information of the first reference device in the memory of the electronic device, and acquire the location information of the first reference device from the memory, or obtain a distance between external electronic devices and the electronic device by performing positioning communication with the external electronic devices using the communication circuit, and acquire the distance as the location information of the first reference device.

The instructions may cause the processor to: identify a space, in which the first reference device is located, based on the location information of the first reference device, determine the identified space as the first noise reduction space, and identify at least one external electronic device, located in the first noise reduction space, using the communication circuit based on location information of the external electronic devices.

The instructions may cause the processor to: select the at least one identified external electronic device as a noise reduction candidate, acquire operation status information of the noise reduction candidate from the noise reduction candidate or a server through the communication circuit, identify at least one external electronic device, which is generating a noise among the noise reduction candidates, based on the acquired operation status information, and determine the identified external electronic device, which is generating the noise, as the first noise reduction device.

The instructions may cause the processor to: acquire the location information of the external electronic devices from a server through the communication circuit, acquire the location information of the external electronic devices from the memory of the electronic device, or obtain a distance between external electronic devices and the electronic device by performing positioning communication with the external electronic devices using the communication circuit, and acquire the distance as the location information of the external electronic devices.

The instructions may cause the processor to: drive a timer with a start of the noise reduction operation, and end the noise reduction operation based on the expiration of a configured time of the timer, end the noise reduction operation based on an endpoint of a user's utterance that is detected from second speech data received through the microphone, or end the noise reduction operation based on an operation in accordance with the second speech data that is completely performed.

The instructions may cause the processor to: calculate a first value, indicating strength of the user input, as the first wakeup score, calculate a second value, indicating a ratio of the strength of the user input to strength of a noise included in the user input, as the first wakeup score, determine a third value, which is a combination of the first value and the second value, as the first wakeup score, or determine a fourth value, obtained by combining a value indicating a performance of the microphone with the first value, the second value, or the third value, as the first wakeup score.

The instructions may cause the processor to: receive identification information from external electronic devices through the communication circuit, and identify a movable device among the external electronic devices based on the identification information of the external electronic devices, obtain a distance between the movable device and the electronic device by performing positioning communication with the movable device using the communication circuit, and determine the movable device as the first noise reduction device based on the distance.

The instructions may cause the processor to: identify a noise source designated among external electronic devices based on identification information of the external electronic devices, and determine the noise source as the first noise reduction device.

The instructions may cause the processor to: identify a noise source designated among external electronic devices based on identification information of the external electronic devices, determine that the noise source is generating a noise, based on operation status information of the noise source, and determine the noise source as the first noise reduction device based on the noise source that is determined to be generating the noise.

The instructions may cause the processor to determine the electronic device as the first reference device based on a source of the user input that is another source that is not the first speech data.

According to various embodiments, an electronic device may include a communication circuit; a processor operatively connected to the communication circuit; and a memory operatively connected to the processor, wherein the memory, when executed, stores instructions for causing the processor to: receive information, indicating strength of a user voice received by an external electronic device, from the external electronic device through the communication circuit, determine the external electronic device as a reference device for configuring a noise reduction space, at least based on the voice strength information, configure the noise reduction space based on location information of the reference device, determine at least one of one or more electronic devices, located in the noise reduction space, as a noise reduction device to perform a noise reduction operation, and control the noise reduction operation of the noise reduction device.

The instructions may cause the processor to: identify a space, in which the reference device is located, based on the location information of the reference device, determine the identified space as the noise reduction space, and identify at least one external electronic device located in the noise reduction space, based on location information of external electronic devices.

The instructions may cause the processor to: select the at least one identified external electronic device as a noise reduction candidate, acquire operation status information of the noise reduction candidate from the noise reduction candidate or a server through the communication circuit, identify at least one external electronic device, which is generating a noise among the noise reduction candidates, based on the acquired operation status information, and determine the identified external electronic device, which is generating the noise, as the noise reduction device.

The instructions may cause the processor to: identify a noise source designated among external electronic devices based on identification information of the external electronic devices, and determine the noise source as the noise reduction device.

The instructions may cause the processor to: identify a noise source designated among external electronic devices based on identification information of the external electronic devices, determine that the noise source is generating a noise, based on operation status information of the noise source, and determine the noise source as the noise reduction device based on the noise source that is determined to be generating the noise.

According to various embodiments, a method for operating an electronic device may include receiving speech data through a microphone of the electronic device; recognizing a user input to call a voice assistant from the speech data; converting the user input into a first wakeup score; determining the electronic device as a reference device at least based on the wakeup score that exceeds a designated threshold value; configuring a noise reduction space based on location information of the reference device; determining at least one of one or more electronic devices, located in the noise reduction space, as a noise reduction device to perform a noise reduction operation; and controlling the noise reduction operation of the noise reduction device.

According to various embodiments, a method for operating an electronic device may include receiving information, indicating strength of a user voice listened by an external electronic device, from the external electronic device through the communication circuit; determining the external electronic device as a reference device for configuring a noise reduction space, at least based on the voice strength information; configuring the noise reduction space based on location information of the reference device; determining at least one of one or more electronic devices, located in the noise reduction space, as a noise reduction device to perform a noise reduction operation; and controlling the noise reduction operation of the noise reduction device.

Figure 10:
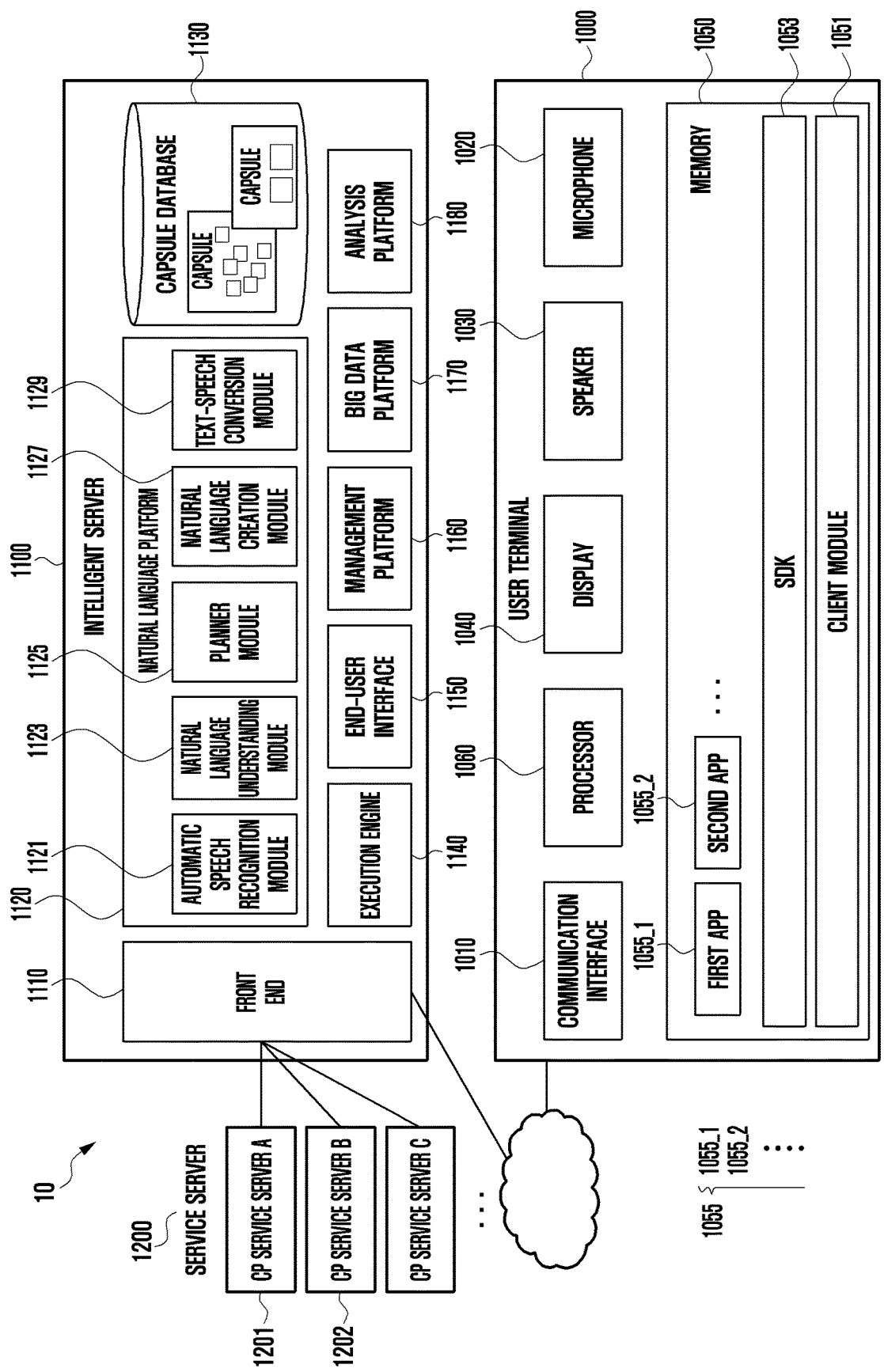
FIG. 10 is a block diagram illustrating an integrated intelligence system according to an embodiment of the disclosure.

FIG. 10 is a block diagram illustrating an integrated intelligence system according to an embodiment of the disclosure.

Referring to FIG. 10, an integrated intelligence system 10 according to an embodiment may include a user terminal 1000 (e.g., electronic device 101 of FIG. 2), an intelligent server 1100 (e.g., server 220 of FIG. 2), and a service server 1200.

The user terminal according to an embodiment may be a terminal device (or electronic device) connectable to the Internet, and for example, it may be a portable phone, a smart phone, a personal digital assistant (PDA), a notebook computer, a TV, a major home appliance, a wearable device, a head-mounted display (HMD), or a smart speaker.

According to an illustrated embodiment, the user terminal 1000 may include a communication interface 1010 (e.g., communication module 190 of FIG. 2), a microphone 1020, a speaker 1030 (e.g., sound output device 155 of FIG. 2), a display 1040 (e.g., display device 160 of FIG. 2), a memory 1050 (e.g., memory 130 of FIG. 2), or a processor 1060 (e.g., processor 120 of FIG. 2). The above-described constituent elements may be operatively or electrically connected to one another.

The communication interface 1010 according to an embodiment may be connected to an external device and may be configured to transmit or receive data. The microphone 1020 according to an embodiment may receive and convert sound (e.g., user's utterance) into an electrical signal. The speaker 1030 according to an embodiment may output the electrical signal as sound (e.g., voice). The display 1040 according to an embodiment may be configured to display an image or video. The display 1040 according to an embodiment may also display a graphical user interface (GUI) of an app (or application program) being executed.

The memory 1050 according to an embodiment may store a client module 1051, a software development kit (SDK) 1053, and a plurality of apps 1055. The client module 1051 and the SDK 1053 may configure a framework (or solution program) to perform general-purpose functions. Further, the client module 1051 and the SDK 1053 may configure a framework to process a voice input.

The plurality of apps 1055 may be programs to perform designated functions. According to an embodiment, the plurality of apps 1055 may include a first app 1055_1 and a second app 1055_3. According to an embodiment, the plurality of apps 1055 may include a plurality of operations to perform designated functions. For example, the above-described apps may include an alarm app, a message app, and/or a schedule app. According to an embodiment, the plurality of apps 1055 may be executed by the processor 1060 to successively perform at least parts of the plurality of operations.

The processor 1060 according to an embodiment may control the overall operation of the user terminal 1000. For example, the processor 1060 may be electrically connected to the communication interface 1010, the microphone 1020, the speaker 1030, and the display 1040, and may perform designated operations.

The processor 1060 according to an embodiment may perform designated functions through execution of programs stored in the memory 1050. For example, the processor 1060 may perform the following operations to process the voice input by executing at least one of the client module 1051 or the SDK 1053. The processor 1060 may control the operations of the plurality of apps 1055 through, for example, the SDK 1053. The following operations being explained as the operations of the client module 1051 or the SDK 1053 may be operations through the execution of the processor 1060.

The client module 1051 according to an embodiment may receive the voice input. For example, the client module 1051 may receive a voice signal corresponding to the user's utterance sensed through the microphone 1020. The client module 1051 may transmit the received voice input to the intelligent server 1100 through the communication interface 1010. The client module 1051 may transmit status information of the user terminal 1000 to the intelligent server 1100 through the communication interface 1010 together with the received voice input. The status information may be, for example, app execution status information.

The client module 1051 according to an embodiment may receive the result corresponding to the received voice input. For example, in case that the intelligent server 110 can calculate the result corresponding to the received voice input, the client module 1051 may receive the result corresponding to the received voice input. The client module 1051 may display the received result on the display 1041.

The client module 1051 according to an embodiment may receive a plan corresponding to the received voice input. The client module 1051 may display the result of executing the plurality of operations of the apps on the display 1040 in accordance with the plan. For example, the client module 1051 may successively display the result of executing the plurality of operations on the display. As another example, the user terminal 1000 may display only the partial result of executing the plurality of operations (e.g., the result of the last operation) on the display.

According to an embodiment, the client module 1051 may receive a request for acquiring information that is necessary to calculate the result corresponding to the voice input from the intelligent server 1100 through the communication interface 1010. According to an embodiment, the client module 1051 may transmit the necessary information to the intelligent server 1100 through the communication interface 1010 to correspond to the request.

The client module 1051 according to an embodiment may transmit the information on the result of executing the plurality of operations to the intelligent server 110 through the communication interface 1010 in accordance with the plan. The intelligent server 1100 may identify that the received voice input has been correctly processed using the result information.

The client module 1051 according to an embodiment may include a speech recognition module. According to an embodiment, the client module 1051 may recognize the voice input to perform a limited function through the speech recognition module. For example, the client module 1051 may perform an intelligent app to process the voice input for performing an organic operation through the designated input (e.g., "Wake up!").

The intelligent server 1100 according to an embodiment may receive information related to the user voice input from the user terminal 1000 through the communication network. According to an embodiment, the intelligent server 1100 may change data related to the received voice input to text data. According to an embodiment, the intelligent server 1100 may generate a plan for performing a task corresponding to the user voice input based on the text data.

According to an embodiment, the plan may be generated by an artificial intelligent (AI) system. The artificial intelligent system may be a rule-based system, or neural network-based system (e.g., feed forward neural network (FNN)), or a recurrent neural network (RNN)). Further, the artificial intelligent system may be a combination of the above-described systems or networks, or may be an artificial intelligent system different from the above-described systems or networks. According to an embodiment, the plan may be selected from a set of predefined plans, or may be generated in real time in response to a user request. For example, the artificial intelligent system may select at least one of the predefined plural plans.

The intelligent server 1100 according to an embodiment may transmit the result in accordance with the generated plan to the user, or may transmit the generated plan to the user terminal 1000. According to an embodiment, the user terminal 1000 may display the result in accordance with the plan on the display. According to an embodiment, the user terminal 1000 may display the result of executing the operation in accordance with the plan on the display.

The intelligent server 1100 according to an embodiment may include a front end 1110, a natural language platform 1120, a capsule database (DB) 1130, an execution engine 1140, an end user interface 1150, a management platform 1160, a big data platform 1170, or an analytic platform 1180.

The front end 1110 according to an embodiment may receive a voice input received from the user terminal 1000. The front end 1110 may transmit a response corresponding to the voice input.

According to an embodiment, the natural language platform 1120 may include an automatic speech recognition module (ASR module) 1121 (e.g., ASR module 221 of FIG. 2), a natural language understanding module (NLU module) 1123 (e.g., NLU module 222 of FIG. 2), a planner module 1125, a natural language generator module (NLG module) 1127, or a text to speech module (TTS module) 1129.

The automatic speech recognition module 1121 according to an embodiment may convert the voice input received from the user terminal 1000 into text data. The natural language understanding module 1123 according to an embodiment may grasp the user's intent using the text data of the voice input. For example, the natural language understanding module 1123 may grasp the user's intent by performing the syntactic analysis or semantic analysis. The natural language understanding module 1123 according to and embodiment may grasp the meaning of a word extracted from the voice input using the linguistic feature (e.g., grammatical element) of a morpheme or a phrase, and may determine the user's intent by matching the meaning of the grasped word with the intent.

The planner module 1125 according to an embodiment may generate the plan using intents and parameters determined by the natural language understanding module 1123. According to an embodiment, the planner module 1125 may determine a plurality of domains that are necessary to perform tasks based on the determined intent. The planner module 1125 may determine a plurality of operations included in the plurality of determined domains based on the intent. According to an embodiment, the planner module 1125 may determine parameters necessary to execute the plurality of determined operations or the resultant values being output through the execution of the plurality of operations. The parameters and the resultant values may be defined by the concepts of designated formats (or classes). Accordingly, the plan may include the plurality of operations and the plurality of concepts, which are determined by the user's intent. The planner module 1125 may determine the relationships between the plurality of operations and the plurality of concepts operation by operation (or hierarchically). For example, the planner module 1125 may determine, based on the plurality of concepts, the order of executions of the plurality of operations determined based on the user's intent. In other words, the planner module 1125 may determine the order of executions of the plurality of operations based on the parameters necessary to execute the plurality of operations and the results being output through the execution of the plurality of operations. Accordingly, the planner module 1125 may generate the plan including related information (e.g., ontology) between the plurality of operations and the plurality of concepts. The planner module 1125 may generate the plan using information stored in the capsule database 1130 in which a set of relationships between the concepts and the operations is stored.

The natural language generation module 1127 according to an embodiment may change the designated information to a text form. The information changed to the text form may be a form of natural language utterance. The text to speech conversion module 1129 according to an embodiment may change the information in the text form to information in a speech form.

According to an embodiment, a part or the whole of functions of the natural language platform 1120 can be implemented even by the user terminal 1000.

The capsule database 1130 may store information on the relationships between the plurality of concepts and operations corresponding to the plurality of domains. The capsule according to an embodiment may include a plurality of action objects (or action information) and concept objects (or concept information) included in the plan. According to an embodiment, the capsule database 1130 may store the plurality of capsules in the form of a concept action network (CAN). According to an embodiment, the plurality of capsules may be stored in a function registry included in the capsule database 1130.

The capsule database 1130 may include a strategy registry in which strategy information being necessary to determine the plan corresponding to the voice input is stored. The strategy information may include reference information to determine one plan in case that there are a plurality of plans corresponding to the voice input. According to an embodiment, the capsule database 1130 may include a follow up registry which stores therein follow up information for proposing a follow up operation to the user in a designated situation. The follow up operation may include, for example, a follow up utterance. According to an embodiment, the capsule database 1130 may include a layout registry storing layout information of the information being output through the user terminal 1000. According to an embodiment, the capsule database 1130 may include a vocabulary registry in which vocabulary information included in the capsule information is stored. According to an embodiment, the capsule database 1130 may include a dialog registry in which information on a dialog (or interaction) with the user is stored. The capsule database 1130 may update an object stored through a developer tool. The developer tool may include, for example, a function editor for updating the action object or the concept object. The developer tool may include a vocabulary editor for updating the vocabulary. The developer tool may include a strategy editor generating the dialog with the user. The developer tool may include a follow up editor capable of activating a follow up target and editing a follow up utterance that provides a hint. The follow up target may be determined based on a currently set target, a user preference, or an environment condition. In an embodiment, the capsule database 1130 may be able to be implemented even in the user terminal 1000.

The execution engine 1140 according to an embodiment may calculate the result using the generated plan. The end user interface 1150 may transmit the calculated result to the user terminal 1000. Accordingly, the user terminal 1000 may receive the result, and may provide the received result to the user. The management platform 1160 according to an embodiment may manage information being used by the intelligent server 1100. The big data platform 1170 according to an embodiment may collect user's data. The analysis platform 1180 according to an embodiment may manage the quality of service (QoS) of the intelligent server 1100. For example, the analysis platform 1180 may manage the constituent element and the processing speed (or efficiency) of the intelligent server 1100.

The service server 1200 according to an embodiment may provide a designated service (e.g., food order or hotel reservation) to the user terminal 1000. According to an embodiment, the service server 1200 may be a server being operated by a third party. The service server 1200 according to an embodiment may provide information for generating the plan corresponding to the received voice input to the intelligent server 1100. The provided information may be stored in the capsule database 1130. Further, the service server 1200 may provide the result information in accordance with the plan to the intelligent server 1100. The service server 1200 may include at least, CP service server A 1201 and CP service server B 1202.

In the integrated intelligent system 10 as described above, the user terminal may provide various intelligent services to the user in response to the user input. The user input may include, for example, an input through a physical button, a touch input, or a voice input.

In an embodiment, the user terminal 1000 may provide a speech recognition service through an intelligent app (or speech recognition app) stored therein. In this case, for example, the user terminal 1000 may recognize a user's utterance or a voice input received through the microphone, and may provide a service corresponding to the recognized voice input to the user.

In an embodiment, the user terminal 1000 may perform a designated operation based on the received voice input solely or together with the intelligent server and/or the service server. For example, the user terminal 1000 may execute the app corresponding to the received voice input, and may perform the designated operation through the executed app.

In an embodiment, in case that the user terminal 1000 provides the service together with the intelligent server 1100 and/or the service server, the user terminal may sense the user's utterance using the microphone 1020, and may generate a signal (or speech data) corresponding to the sensed user's utterance. The user terminal may transmit the speech data to the intelligent server 1100 using the communication interface 1010.

The intelligent server 1100 according to an embodiment may generate a plan for performing a task corresponding to the voice input or the result of performing the operation in accordance with the plan in response to the voice input received from the user terminal 1000. The plan may include, for example, a plurality of actions for performing the task corresponding to the user's voice input and a plurality of concepts related to the plurality of actions. The concept may define the parameters being input through the execution of the plurality of actions or the resultant values being output through the execution of the plurality of actions. The plan may include related information between the plurality of actions and the plurality of concepts.

The user terminal 1000 according to an embodiment may receive the response using the communication interface 1010. The user terminal may output a voice signal generated inside the user terminal 1000 to outside using the speaker 1030, or may output an image generated inside the user terminal 1000 to outside using the display 1040.

Figure 11:
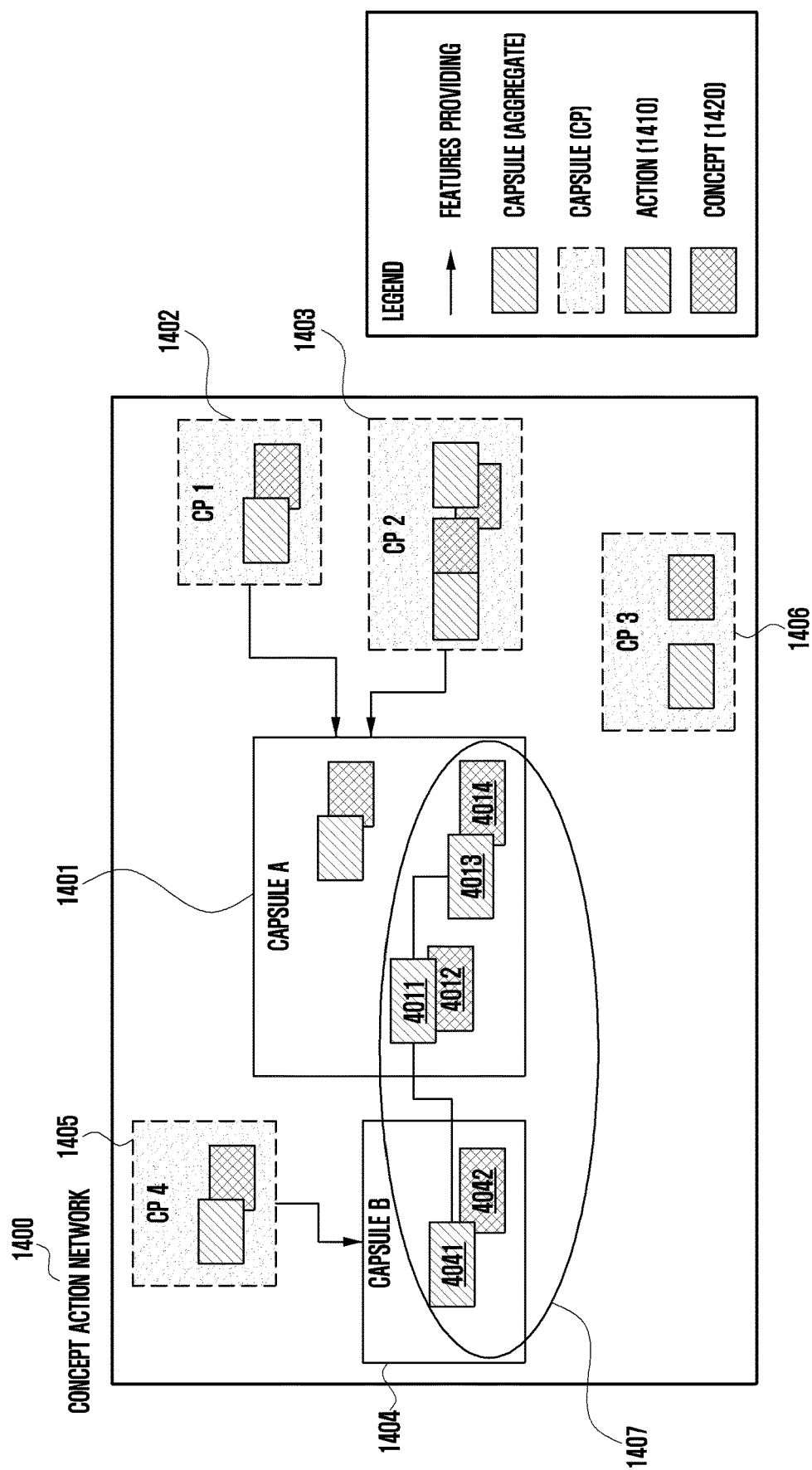
FIG. 11 is a diagram illustrating a form in which relationship information between concepts and actions is stored in a database according to an embodiment of the disclosure.

FIG. 11 is a diagram illustrating a form in which relationship information between concepts and actions is stored in a database according to an embodiment of the disclosure.

A capsule data (e.g., capsule database 1130) of the intelligent server 1100 may store capsules in the form of a concept action network (CAN) 1400. The capsule database may store actions for processing the task corresponding to the user's voice input and parameters necessary for such actions in the form of the concept action network (CAN).

Referring to FIG. 11, the capsule database may store a plurality of capsules (capsule A 1401 and capsule B 1404) corresponding to a plurality of domains (e.g., applications). According to an embodiment, one capsule (e.g., capsule A 1401) may correspond to one domain (e.g., location (geo), application). Further, one capsule may correspond to at least one service provider (e.g., CP 1 1402 or CP 2 1403) to perform the function for the domain related to the capsule. According to an embodiment, one capsule may include at least one action 1410 and at least one concept 1420 for performing the designated function.

The natural language platform 1120 may generate the plan for performing the task corresponding to the received voice input using the capsule stored in the capsule database. For example, the planner module 1125 of the natural language platform may generate the plan using the capsule stored in the capsule database. For example, the planner module may generate the plan 1407 using the actions 4011 and 4013 and the concepts 4012 and 4014 of the capsule A 1401 and the action 4041 and the concept 4042 of the capsule B 1404. Alternatively, the concept action network 1440 includes CP 2 1406 and CP 4 1405.

Figure 12:
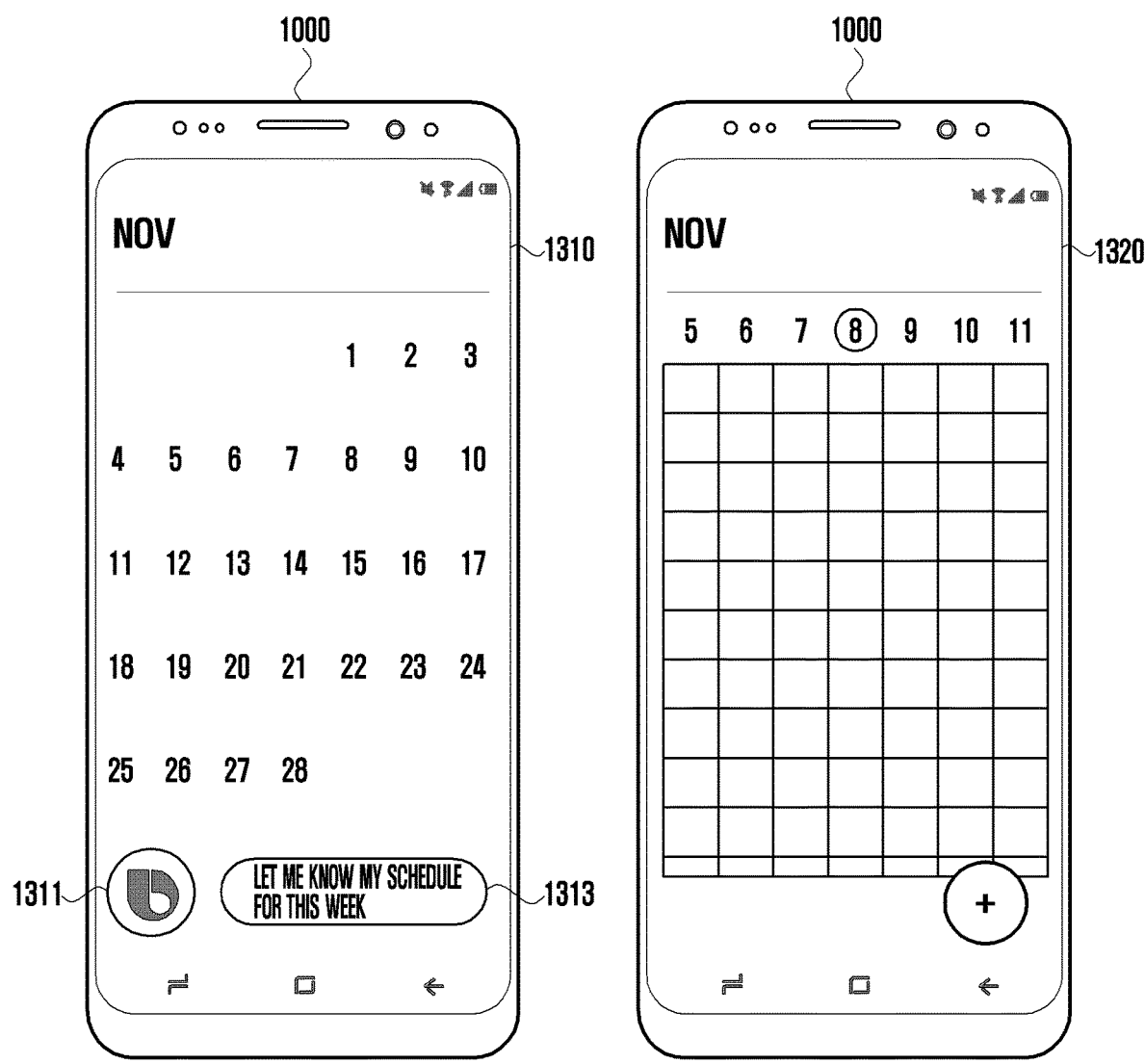
FIG. 12 is a diagram illustrating a user terminal displaying a screen for processing a voice input received through an intelligent app according to an embodiment of the disclosure.

FIG. 12 is a diagram illustrating a user terminal displaying a screen for processing a voice input received through an intelligent app according to an embodiment of the disclosure.

The user terminal 1000 may execute an intelligent app to process a user input through the intelligent server 1100.

Referring to FIG. 12, according to an embodiment, on a screen 1310, if the user terminal 1000 recognizes a designated voice input (e.g., "Wake up") or receives an input through a hardware key (e.g., dedicated hardware key), it may execute an intelligent app for processing the voice input. The user terminal 1000 may execute, for example, the intelligent app in a state where it executes a schedule app. According to an embodiment, the user terminal 1000 may display an object (e.g., icon) 1311 corresponding to the intelligent app on the display 1040. According to an embodiment, the user terminal 1000 may receive the voice input through the user's utterance. For example, the user terminal 1000 may receive the voice input "Let me know my schedule for this week". According to an embodiment, the user terminal 1000 may display, on the display, a user interface (UI) 1313 (e.g., input window) of the intelligent app on which text data of the received voice input is displayed.

According to an embodiment, on a screen 1320, the user terminal 1000 may display the result corresponding to the received voice input on the display. For example, the user terminal 1000 may receive the plan corresponding to the received user input, and may display, on the display, "the schedule for this week" in accordance with the plan.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a microphone;
   a processor operatively connected to the microphone;
   a communication circuit operatively connected to the processor; and
   a memory operatively connected to the processor, the memory configured to store instructions,
   wherein the stored instructions, when executed, cause the processor to:
     receive first speech data through the microphone,
     recognize a user input to call a voice assistant from the first speech data,
     convert the user input into a first wakeup score,
     receive a second wakeup score from an external electronic device through the communication circuit,
     determine the electronic device as a first reference device among the electronic device and the external electronic device at least based on the first wakeup score exceeding a designated threshold value and the second wakeup score being below the threshold value,
     configure a first noise reduction space based on location information of the first reference device,
     determine at least one of one or more electronic devices, located in the first noise reduction space, as a first noise reduction device to perform a noise reduction operation, and
     control the noise reduction operation of the first noise reduction device, and
   wherein the determining of the at least one of the one or more electronic devices, located in the first noise reduction space, as the first noise reduction device comprises:
     identifying a noise source by identifying at least one of: kinds of devices located in the first noise reduction space, specifications of devices located in the first noise reduction space, and capability information of devices located in the first noise reduction space, and
     determining the identified noise source as the first noise reduction device, wherein the stored instructions, when executed, cause the processor to:
     calculate a first value, indicating a strength of the user input,
     calculate a second value, indicating a ratio of the strength of the user input to strength of a noise included in the user input,
     determine a third value, which is a combination of the first value and the second value, and
     determine a fourth value, obtained by combining a value indicating a performance of the microphone with the third value, as the first wakeup score.

2. The electronic device of claim 1,
   wherein the stored instructions, when executed, cause the processor to:
     perform the noise reduction operation of the electronic device based on the electronic device being included in the first noise reduction device, and
     transmit a control signal for performing the noise reduction operation, to an external electronic device through the communication circuit, based on the external electronic device being included in the first noise reduction device.

3. The electronic device of claim 1,
   wherein the stored instructions, when executed, cause the processor to:
     acquire the location information of the first reference device from a server through the communication circuit,
     store the location information of the first reference device in the memory of the electronic device, and acquire the location information of the first reference device from the memory, or obtain a distance between external electronic devices and the electronic device by performing positioning communication with the external electronic devices using the communication circuit, and acquire the distance as the location information of the first reference device.

4. The electronic device of claim 1,
wherein the stored instructions, when executed, cause the processor to:
identify a space, in which the first reference device is located, based on the location information of the first reference device,
determine the identified space as the first noise reduction space, and
identify at least one external electronic device, located in the first noise reduction space, using the communication circuit based on location information of the external electronic devices.

5. The electronic device of claim 4, wherein the stored instructions, when executed, cause the processor to:
select the at least one identified external electronic device as a noise reduction candidate,
acquire operation status information of the noise reduction candidate from the noise reduction candidate or a server through the communication circuit,
identify at least one external electronic device, which is generating a noise among the noise reduction candidates, based on the acquired operation status information, and
determine the identified external electronic device, which is generating the noise, as the first noise reduction device.

6. The electronic device of claim 4, wherein the stored instructions, when executed, cause the processor to:
acquire the location information of the external electronic devices from a server through the communication circuit,
acquire the location information of the external electronic devices from the memory of the electronic device, or
obtain a distance between external electronic devices and the electronic device by performing positioning communication with the external electronic devices using the communication circuit, and acquire the distance as the location information of the external electronic devices.

7. The electronic device of claim 1, wherein the stored instructions, when executed, cause the processor to:
drive a timer with a start of the noise reduction operation, and end the noise reduction operation based on an expiration of a configured time of the timer,
end the noise reduction operation based on an endpoint of a user's utterance that is detected from second speech data received through the microphone, or
end the noise reduction operation based on an operation in accordance with the second speech data that is completely performed.

8. The electronic device of claim 1,
wherein the stored instructions, when executed, cause the processor to:
receive identification information from external electronic devices through the communication circuit, and identify a movable device among the external electronic devices based on the identification information of the external electronic devices,
obtain a distance between the movable device and the electronic device by performing positioning communication with the movable device using the communication circuit, and
determine the movable device as the first noise reduction device based on the distance.

9. The electronic device of claim 1, wherein the stored instructions, when executed, cause the processor to:
identify a noise source designated among external electronic devices based on identification information of the external electronic devices, and
determine the noise source as the first noise reduction device.

10. The electronic device of claim 1, wherein the stored instructions, when executed, cause the processor to:
identify a noise source designated among external electronic devices based on identification information of the external electronic devices,
determine that the noise source is generating a noise, based on operation status information of the noise source, and
determine the noise source as the first noise reduction device based on the noise source that is determined to be generating the noise.

11. The electronic device of claim 1, wherein the stored instructions, when executed, cause the processor to determine the electronic device as the first reference device based on a source of the user input that is another source that is not the first speech data.

12. An electronic device comprising:
a microphone;
a communication circuit;
a processor operatively connected to the communication circuit and the microphone; and
a memory operatively connected to the processor, the memory configured to store instructions,
wherein the stored instructions, when executed, cause the processor to:
receive first speech data through the microphone,
recognize a user input to call a voice assistant from the first speech data,
convert the user input into a first wakeup score,
receive a second wakeup score from an external electronic device through the communication circuit,
determine the external electronic device as a reference device among the electronic device and the external electronic device, at least based on the first wakeup score being below a designated threshold value and the second wakeup score exceeding the threshold value,
configure a noise reduction space based on location information of the reference device,
determine at least one of one or more electronic devices, located in the noise reduction space, as a noise reduction device to perform a noise reduction operation, and
control the noise reduction operation of the noise reduction device, and
wherein the determining of the at least one of the one or more electronic devices, located in the noise reduction space, as the noise reduction device comprises:
identifying a noise source by identifying at least one of: kinds of devices located in the noise reduction space, specifications of devices located in the noise reduction space, and capability information of devices located in the noise reduction space, and determining the identified noise source as a first noise reduction device, and wherein the stored instructions, when executed, further cause the processor to:
calculate a first value, indicating a strength of the user input,
calculate a second value, indicating a ratio of the strength of the user input to strength of a noise included in the user input,
determine a third value, which is a combination of the first value and the second value, and
determine a fourth value, obtained by combining a value indicating a performance of the microphone with the third value, as the first wakeup score.

13. The electronic device of claim 12, wherein the stored instructions, when executed, cause the processor to:
identify a space, in which the reference device is located, based on the location information of the reference device,
determine the identified space as the noise reduction space, and
identify at least one external electronic device located in the noise reduction space, based on location information of external electronic devices.

14. The electronic device of claim 13, wherein the stored instructions, when executed, cause the processor to:
select the at least one identified external electronic device as a noise reduction candidate,
acquire operation status information of the noise reduction candidate from the noise reduction candidate or a server through the communication circuit,
identify at least one external electronic device, which is generating a noise among the noise reduction candidates, based on the acquired operation status information, and
determine the identified external electronic device, which is generating the noise, as the noise reduction device.

15. The electronic device of claim 12, wherein the stored instructions, when executed, cause the processor to:
identify a noise source designated among external electronic devices based on identification information of the external electronic device, and
determine the noise source as the noise reduction device.

16. The electronic device of claim 12, wherein the stored instructions, when executed, cause the processor to:
identify a noise source designated among external electronic devices based on identification information of the external electronic devices,
determine that the noise source is generating a noise, based on operation status information of the noise source, and
determine the noise source as the noise reduction device based on the noise source that is determined to be generating the noise.

17. A method for operating an electronic device, comprising:
receiving speech data through a microphone of the electronic device;
recognizing a user input to call a voice assistant from the speech data;
acquiring a first wakeup score based on the user input;
receiving a second wakeup score from an external electronic device through a communication circuit of the electronic device;
determining the electronic device as a reference device among the electronic device and the external electronic device at least based on the first wakeup score exceeding a designated threshold value and the second wakeup score being below the threshold value;
configuring a noise reduction space based on location information of the reference device;
determining at least one of one or more electronic devices, located in the noise reduction space, as a noise reduction device to perform a noise reduction operation; and
controlling the noise reduction operation of the noise reduction device,
wherein the determining of the at least one of the one or more electronic devices, located in the noise reduction space, as the noise reduction device comprises:
identifying a noise source by identifying at least one of: kinds of devices located in the noise reduction space, specifications of devices located in the noise reduction space, and capability information of devices located in the noise reduction space; and
determining the identified noise source as a first noise reduction device, and wherein the acquiring of the first wakeup score comprises:
calculating a first value, indicating a strength of the user input,
calculating a second value, indicating a ratio of the strength of the user input to strength of a noise included in the user input,
determining a third value, which is a combination of the first value and the second value, and
determining a fourth value, obtained by combining a value indicating a performance of the microphone with the third value, as the first wakeup score.

* * * * *